US012598591B2

(12) United States Patent
Gao et al.

(10) Patent No.: US 12,598,591 B2
(45) Date of Patent: Apr. 7, 2026

(54) COMMUNICATION RESOURCE SCHEDULING METHOD AND APPARATUS

(71) Applicant: HUAWEI TECHNOLOGIES CO., LTD., Shenzhen (CN)

(72) Inventors: Quanzhong Gao, Shanghai (CN); Heng Xu, Shanghai (CN); Zongdi Yue, Moscow (RU); Liwen Zhang, Shanghai (CN); Fang Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 523 days.

(21) Appl. No.: 18/146,730

(22) Filed: Dec. 27, 2022

(65) Prior Publication Data
US 2023/0136286 A1 May 4, 2023

Related U.S. Application Data

(63) Continuation of application No. PCT/CN2021/102777, filed on Jun. 28, 2021.

(30) Foreign Application Priority Data

Jun. 30, 2020 (CN) ........................ 202010617621.X

(51) Int. Cl.
H04W 72/0446 (2023.01)
H04W 72/0453 (2023.01)
(Continued)

(52) U.S. Cl.
CPC ... H04W 72/0446 (2013.01); H04W 72/0453 (2013.01); H04W 72/512 (2023.01); H04W 72/541 (2023.01)

(58) Field of Classification Search
CPC ......... H04W 72/0446; H04W 72/0453; H04W 72/512; H04W 72/541; H04W 72/1263;
(Continued)

(56) References Cited

U.S. PATENT DOCUMENTS 10,820,366 B2 * 10/2020 Jeon ..................... H04W 74/006
12,041,625 B2 * 7/2024 Andgart ................ H04W 72/23
(Continued)

FOREIGN PATENT DOCUMENTS

CN 105589506 A 5/2016
CN 107041003 A 8/2017
(Continued)

*Primary Examiner* — Jay P Patel
(74) *Attorney, Agent, or Firm* — Rimon PC

(57) ABSTRACT

This application provides a communication resource scheduling method and an apparatus. The communication resource scheduling method in this application may include indicating that a first resource of a first cell is used for first transmission, and indicating that a second resource of a neighboring cell of the first cell is used for second transmission. At least one of the time domain, frequency domain, space domain, code domain, or power domain of the second resource is different from at least one of the time domain, frequency domain, space domain, code domain, or power domain of the first resource. In embodiments of this application, different scheduling manners may be used for the first cell and the neighboring cell of the first cell, to meet different service requirements of terminal devices in different cells, and avoid uplink and downlink interference while meeting the different service requirements.

18 Claims, 12 Drawing Sheets

(51) Int. Cl.
    *H04W 72/512*     (2023.01)
    *H04W 72/541*     (2023.01)

(58) Field of Classification Search
    CPC .. H04W 72/542; H04W 72/21; H04L 5/0073;
                         H04L 5/0037; H04L 5/0005
    See application file for complete search history.

(56)                References Cited

U.S. PATENT DOCUMENTS

| | | | |
|---|---|---|---|
| 12,120,063 B2 * | 10/2024 | Fan | H04W 72/20 |
| 2014/0153454 A1 | 6/2014 | Samdanis et al. | |
| 2017/0265203 A1 | 9/2017 | Na et al. | |
| 2017/0311350 A1 | 10/2017 | Chatterjee et al. | |
| 2018/0220421 A1 | 8/2018 | Zhang et al. | |
| 2019/0037509 A1 * | 1/2019 | Li | H04W 56/001 |
| 2019/0357224 A1 * | 11/2019 | Li | H04L 5/0055 |
| 2021/0028906 A1 * | 1/2021 | Li | H04L 1/1607 |
| 2021/0058936 A1 * | 2/2021 | Gordaychik | H04W 72/0453 |
| 2021/0368526 A1 * | 11/2021 | Li | H04W 72/542 |
| 2021/0409097 A1 * | 12/2021 | Zhang | H04B 7/088 |
| 2022/0095176 A1 * | 3/2022 | Lim | H04W 36/0058 |
| 2022/0124787 A1 * | 4/2022 | Andgart | H04W 72/21 |
| 2022/0263613 A1 * | 8/2022 | Fan | H04L 5/006 |

FOREIGN PATENT DOCUMENTS

| | | |
|---|---|---|
| CN | 108282879 A | 7/2018 |
| EP | 2652979 B1 | 7/2015 |

\* cited by examiner

Core network
device 110

Radio access
network device 120

Terminal
device 130

Terminal
device 140

First resource

Second resource

Second resource

GAP

Downlink transmission          Uplink transmission (1) Send a sounding signal by using a GAP
(2) Send a sounding signal by using a dedicated downlink symbol
(3) Send a sounding signal by multiplexing an existing downlink sounding signal (TRS/CSI)

COMMUNICATION RESOURCE SCHEDULING METHOD AND APPARATUS

CROSS-REFERENCE TO RELATED APPLICATIONS

This application is a continuation of International Application No. PCT/CN2021/102777, filed on Jun. 28, 2021, which claims priority to Chinese Patent Application No. 202010617621.X, filed on Jun. 30, 2020. The disclosures of the aforementioned applications are hereby incorporated by reference in their entireties.

TECHNICAL FIELD

This application generally relates to communication technologies, and in particular, to a communication resource scheduling method and an apparatus.

BACKGROUND

With developments in wireless communication technologies and a rapid increase of mobile user requirements, a future wireless communication network faces a challenge of wireless spectrum resource shortage.

Users have different service requirements in different service scenarios. For example, a to business (2B) service scenario has high requirements on an uplink capacity, to be specific, on uplink transmission bandwidth and an uplink transmission rate. However, a to consumer (2C) service scenario has high requirements on a downlink capacity, to be specific, on downlink transmission bandwidth and a downlink transmission rate.

How to meet service requirements of different users in different service scenarios with limited wireless spectrum resources becomes an urgent technical problem to be resolved.

SUMMARY

This application provides a communication resource scheduling method and an apparatus, to meet service requirements of different users in case of limited wireless spectrum resources.

According to a first aspect, this application provides a communication resource scheduling method. The method may include a first communication apparatus that indicates that a first resource of a first cell is used for first transmission. The first communication apparatus indicates that a second resource of a neighboring cell of the first cell is used for second transmission, where at least one of a time domain, a frequency domain, a space domain, a code domain, or a power domain of the second resource is different than at least one of a time domain, a frequency domain, a space domain, a code domain, or a power domain of the first resource. When the first transmission is an uplink transmission, the second transmission is a downlink transmission; or when the first transmission is a downlink transmission, the second transmission is an uplink transmission.

In some embodiments, it is indicated that the first resource of the first cell is used for the first transmission, and it is indicated that the second resource of the neighboring cell of the first cell is used for the second transmission. At least one of the time domain, the frequency domain, the space domain, the code domain, or the power domain of the second resource is different than at least one of the time domain, the frequency domain, the space domain, the code domain, or the power domain of the first resource. Different scheduling manners are used for the first cell and the neighboring cell of the first cell, to meet different service requirements of terminal devices in different cells, and avoid uplink and downlink interference while meeting the different service requirements.

In a possible design, both the first resource and the second resource are flexible time-frequency domain resources. The flexible time-frequency domain resource may be a time-frequency domain resource in an F slot.

In some embodiments, uplink and downlink resources may be dynamically adjusted based on a load status of a cell, to meet a service requirement of the cell. For example, an area covered by the first cell is an industrial park, and an uplink transmission requirement of the industrial park is high. However, an area covered by the neighboring cell of the first cell is a residential area, and a downlink transmission requirement of the residential area is high. To meet service transmission requirements of different cells, the method in some embodiments may be used to schedule the first resource in an F slot in the first cell for uplink transmission, and schedule the second resource in an F slot in the neighboring cell of the first cell for downlink transmission. To avoid the uplink and downlink interference, at least one of time domain, frequency domain, space domain, code domain, or power domain of the first resource is different than at least one of the time domain, the frequency domain, the space domain, the code domain, or the power domain of the second resource.

In some embodiments, the F slot may be further dynamically scheduled at different times for uplink transmission or downlink transmission, to effectively resist a tidal effect in a network. For example, a large quantity of uplink transmission resources are configured in a cell in the industrial park at night, to meet an industrial digitalization requirement.

The method in some embodiments is not only applicable to a time division duplex (TDD) system, but also applicable to a frequency division duplex (FDD) system.

In a possible design, a strength of signal interference between the neighboring cell of the first cell and the first cell is greater than a first threshold, and a service volume of the second transmission of the neighboring cell of the first cell is greater than a second threshold; or strength of signal interference between the neighboring cell of the first cell and the first cell is greater than a first threshold; and the time domain of the second resource of the neighboring cell is different than the time domain of the first resource.

In some embodiments, a time-domain coordinated manner may be used based on the service volume and the strength of the signal interference, or based on the strength of the signal interference, to avoid the uplink and downlink interference.

In a possible design, if strength of signal interference between the neighboring cell of the first cell and the first cell is greater than a first threshold, and a service volume of the second transmission of the neighboring cell of the first cell is less than a second threshold, the second resource of the neighboring cell may not be scheduled. Time domain of the second resource of the neighboring cell is the same as time domain of the first resource.

In some embodiments, when the service volume of the second transmission of the neighboring cell of the first cell is low; and interference between the first cell and the neighboring cell is a strong interference, to avoid the uplink and downlink interference, the second resource of the neighboring cell may not be scheduled.

In a possible design, a strength of signal interference between the neighboring cell of the first cell and the first cell is less than a first threshold and greater than a third threshold, and a service volume of the second transmission of the neighboring cell of the first cell is greater than a second threshold; or a strength of signal interference between the neighboring cell of the first cell and the first cell is less than a first threshold and greater than a third threshold; and the frequency domain of the second resource of the neighboring cell is different than the frequency domain of the first resource.

In some embodiments, a frequency-domain coordinated manner may be used based on the service volume and the strength of the signal interference, or based on the strength of the signal interference, to avoid the uplink and downlink interference.

In a possible design, strength of signal interference between the neighboring cell of the first cell and the first cell is less than a third threshold, and a service volume of the second transmission of the neighboring cell of the first cell is greater than a second threshold; or strength of signal interference between the neighboring cell of the first cell and the first cell is less than a third threshold; and at least one of the space domain, the code domain, or the power domain of the second resource of the neighboring cell is different than at least one of the space domain, the code domain, or the power domain of the first resource.

In some embodiments, at least one of a space-domain coordinated manner, a code-domain coordinated manner, or a power-domain coordinated manner may be used based on the service volume and the strength of the signal interference, or based on the strength of the signal interference, to avoid the uplink and downlink interference.

In a possible design, the first transmission is uplink transmission, and the method further includes: receiving uplink data on the first resource, and demodulating the uplink data by using a channel estimation result of a demodulation reference signal (DMRS) on a third resource, where the third resource and the first resource have a same frequency-domain position but different time-domain positions; or receiving uplink data on the first resource and demodulating the uplink data on the first resource to obtain first demodulated data, receiving uplink data on a third resource and demodulating the uplink data on the third resource to obtain second demodulated data, and combining the first demodulated data and the second demodulated data.

In some embodiments, in a joint demodulation manner, demodulation performance can be improved, and data can be ensured to be received accurately.

In a possible design, a service volume of the first transmission is greater than a fourth threshold, and/or a service type of the first transmission includes ultra-reliable low-latency (URLLC).

In some embodiments, whether to perform uplink transmission enhancement or downlink transmission enhancement in the first cell may be determined based on a service volume and/or a service type of uplink transmission or downlink transmission of the first cell. When it is determined to perform the uplink transmission enhancement or the downlink transmission enhancement in the first cell, the foregoing implementations may be used to indicate that the first resource of the first cell is used for uplink transmission or downlink transmission, and a time-domain, frequency-domain, space-domain, code-domain, or power-domain coordinated manner is used for the neighboring cell of the first cell, to avoid the uplink and downlink interference between neighboring cells.

In a possible design, the service volume includes at least one of the following: an average actual service volume of the first transmission within first preset duration, an actual service volume of the first transmission at at least one moment, an average predicted service volume of the first transmission within second preset duration, or a predicted service volume of the first transmission at at least one moment.

In a possible design, the method further includes: receiving first information from a second communication apparatus, where the first information indicates that the first resource of the first cell is used for the first transmission; or determining, based on at least one of the service volume or the service type of the first transmission of the first cell and at least one of the service volume or a service type of the second transmission of the neighboring cell of the first cell, that the first resource of the first cell is used for the first transmission.

In a possible design, neighboring cells of the first cell are located in a same cell cluster.

In some embodiments, cell cluster division is performed, and coordinated scheduling is performed in cell clusters, to reduce coordination complexity and a delay, and improve efficiency of the coordinated scheduling.

In a possible design, the method further includes: sending a sounding signal, where the sounding signal is used to measure the strength of the signal interference between the first cell and the neighboring cell of the first cell; and receiving the strength of the signal interference, where the strength of the signal interference is used to determine that at least one of the time domain, the frequency domain, the space domain, the code domain, or the power domain of the second resource is different than at least one of the time domain, the frequency domain, the space domain, the code domain, or the power domain of the first resource.

According to a second aspect, this application provides a communication apparatus. The communication apparatus may be a radio access network device, or a chip, a system on chip, or a board in the radio access network device, or may be a functional module that is in the radio access network device and that is configured to implement the method in any one of the first aspect or the possible designs of the first aspect. The communication apparatus may be used as a first communication apparatus. The communication apparatus may implement functions performed by the first communication apparatus in the first aspect or the possible designs of the first aspect. The functions may be implemented by hardware executing corresponding software. The hardware or software includes one or more modules corresponding to the functions. For example, in a possible implementation, the communication apparatus may include a processing module, configured to indicate, by using a transceiver module, that a first resource of a first cell is used for first transmission. The processing module is further configured to indicate, by using the transceiver module, that a second resource of a neighboring cell of the first cell is used for second transmission, where at least one of a time domain, a frequency domain, a space domain, a code domain, or a power domain of the second resource is different than at least one of a time domain, a frequency domain, a space domain, a code domain, or a power domain of the first resource. When the first transmission is an uplink transmission, the second transmission is a downlink transmission; or when the first transmission is a downlink transmission, the second transmission is an uplink transmission.

In a possible design, both the first resource and the second resource are flexible time-frequency domain resources.

In a possible design, a service volume of the second transmission is greater than a second threshold.

In a possible design, a strength of signal interference between the neighboring cell of the first cell and the first cell is greater than a first threshold, and time domain of the second resource of the neighboring cell is different from time domain of the first resource.

In a possible design, a strength of signal interference between the neighboring cell of the first cell and the first cell is less than a first threshold and greater than a third threshold, and the frequency domain of the second resource of the neighboring cell is different than the frequency domain of the first resource.

In a possible design, a strength of signal interference between the neighboring cell of the first cell and the first cell is less than a third threshold, and at least one of the space domain, the code domain, or the power domain of the second resource of the neighboring cell is different than at least one of the space domain, the code domain, or the power domain of the first resource.

In a possible design, the service volume of the second transmission is less than the second threshold, the second resource of the neighboring cell may not be scheduled, and time domain of the second resource is the same as time domain of the first resource.

In a possible design, the first transmission is an uplink transmission. The transceiver module is further configured to receive uplink data on the first resource, and the processing module is further configured to demodulate the uplink data by using a channel estimation result of a demodulation reference signal (DMRS) on a third resource, where the third resource and the first resource have a same frequency-domain position but different time-domain positions; or the transceiver module is further configured to receive uplink data on the first resource and the processing module is further configured to demodulate the uplink data on the first resource to obtain first demodulated data, the transceiver module is further configured to receive uplink data on a third resource and the processing module is further configured to demodulate the uplink data on the third resource to obtain second demodulated data, and combine the first demodulated data and the second demodulated data.

In a possible design, a service volume of the first transmission is greater than a fourth threshold, and/or a service type of the first transmission includes URLLC.

In a possible design, the service volume includes at least one of the following: an average actual service volume of the first transmission within first preset duration, an actual service volume of the first transmission at at least one moment, an average predicted service volume of the first transmission within second preset duration, or a predicted service volume of the first transmission at at least one moment.

In a possible design, the transceiver module is further configured to receive first information sent by a second communication apparatus, where the first information indicates that the first resource of the first cell is used for the first transmission; or the processing module is further configured to determine, based on at least one of the service volume or the service type of the first transmission of the first cell and at least one of the service volume or a service type of the second transmission of the neighboring cell of the first cell, whether to use the transceiver module to perform a step of indicating that the first resource of the first cell is used for the first transmission.

In a possible design, neighboring cells of the first cell are located in a same cell cluster.

In a possible design, the processing module is further configured to send a sounding signal by using the transceiver module, where the sounding signal is used to measure the strength of the signal interference between the first cell and the neighboring cell of the first cell. The transceiver module is further configured to receive the strength of the signal interference, where the strength of the signal interference is used to determine that at least one of the time domain, the frequency domain, the space domain, the code domain, or the power domain of the second resource is different than at least one of the time domain, the frequency domain, the space domain, the code domain, or the power domain of the first resource.

According to a third aspect, this application provides a communication apparatus, including one or more processors; and a memory, configured to store one or more programs. When the one or more programs are executed by the one or more processors, the one or more processors are enabled to implement the method in any one of the first aspect or the possible designs of the first aspect.

According to a fourth aspect, this application provides a computer-readable storage medium, including a computer program. When the computer program is executed on a computer, the computer is enabled to perform the method according to any one of the first aspect.

According to a fifth aspect, this application provides a computer program. When the computer program is executed by a computer, the computer program is configured to perform the method according to any one of the first aspect.

According to a sixth aspect, this application provides a chip, including a processor and a memory. The memory is configured to store a computer program, and the processor is configured to invoke and run the computer program stored in the memory, to perform the method according to any one of the first aspect.

According to the communication resource scheduling method and the apparatus in embodiments of this application, it is indicated that the first resource of the first cell is used for the first transmission, and it is indicated that the second resource of the neighboring cell of the first cell is used for the second transmission. At least one of a time domain, a frequency domain, a space domain, a code domain, or a power domain of the second resource is different than at least one of a time domain, a frequency domain, a space domain, a code domain, or a power domain of the first resource. Different scheduling manners are used for the first cell and the neighboring cell of the first cell, to meet different service requirements of terminal devices in different cells, and avoid the uplink and downlink interference while meeting the different service requirements.

DESCRIPTION OF EMBODIMENTS

The terms such as "first" and "second" in embodiments of this application are only used for distinguishing and description, but should not be understood as an indication or implication of relative importance, or an indication or implication of an order. In addition, the terms "include", "have", and any variant thereof are intended to cover non-exclusive inclusion, for example, include a series of steps or units. Methods, systems, products, or devices are not necessarily limited to those steps or units that are literally listed, but may include other steps or units that are not literally listed or that are inherent to such processes, methods, products, or devices.

It should be understood that in this application, "at least one (item)" refers to one or more, and "a plurality of" refers to two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof represents any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

Figure 1:
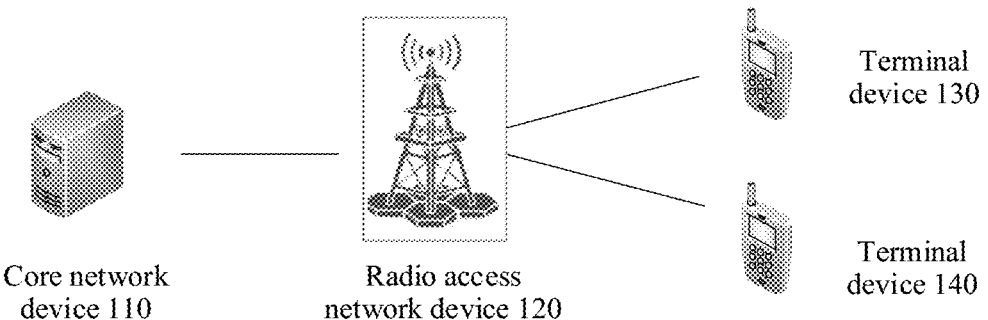
FIG. 1 is a schematic diagram of an architecture of a mobile communication system to which an embodiment of this application is applied.

FIG. 1 is a schematic diagram of an architecture of a mobile communication system to which an embodiment of this application is applied. As shown in FIG. 1, the mobile communication system includes a core network device 110, a radio access network device 120, and at least one terminal device (for example, a terminal device 130 and a terminal device 140) in FIG. 1). The terminal device is connected to the radio access network device in a wireless manner, and the radio access network device is connected to the core network device in a wireless or wired manner. The core network device and the radio access network device may be independent and different physical devices, a function of the core network device and a logical function of the radio access network device may be integrated into a same physical device, or a part of functions of the core network device and a part of functions of the radio access network device may be integrated into one physical device. The terminal device may be located at a fixed position, or may be mobile. FIG. 1 is merely a schematic diagram. The communication system may further include other network devices, for example, may further include a wireless relay device and a wireless backhaul device, which are not shown in FIG. 1. A quantity of core network devices, a quantity of radio access network devices, and a quantity of terminal devices included in the mobile communication system are not limited in embodiments of this application. For example, the mobile communication system may include 2, 3, 6, or any quantity of radio access network devices.

The radio access network device is an access device used by the terminal device to access the mobile communication system in a wireless manner, and may be a base station (NodeB), an evolved NodeB (eNodeB), a base station in a new radio (NR) mobile communication system, a base station in a future mobile communication system, an access node in a wireless-fidelity (Wi-Fi) system, or the like. A particular technology and a particular device form used by the radio access network device are not limited in embodiments of this application.

The terminal device may also be referred to as a terminal, user equipment (UE), a mobile station (MS), a mobile terminal (MT), or the like. The terminal device may be a mobile phone, a tablet computer (Pad), a computer having a wireless receiving and sending function, a virtual reality (VR) terminal device, an augmented reality (AR) terminal device, a wireless terminal in industrial control, a wireless terminal in assisted driving, a wireless terminal in self driving, a wireless terminal in remote medical surgery, a wireless terminal in a smart, a wireless terminal in transportation safety, a wireless terminal in a smart city, a wireless terminal in a smart home, or the like.

The radio access network device and the terminal device may be deployed on land, where deployment includes indoor, outdoor, handheld, or vehicle-mounted deployment: or may be deployed on water: or may be deployed on an airplane, a balloon, and a satellite in air. Application scenarios of the radio access network device and the terminal device are not limited in embodiments of this application.

Embodiments of this application may be applied to downlink transmission, may be applied to uplink transmission, or may be applied to device-to-device (D2D) signal transmission. For the downlink transmission, a sending device is a radio access network device, and a corresponding receiving device is a terminal device. For the uplink transmission, a sending device is a terminal device, and a corresponding receiving device is a radio access network device. For the D2D signal transmission, a sending device is a terminal device, and a corresponding receiving device is also a terminal device. A transmission direction is not limited in embodiments of this application.

A coverage area of the radio access network device in embodiments of this application may include one cell, or may include a plurality of cells.

In a wireless communication network, different users have different service requirements for using a terminal device. For example, some users have an uplink service requirement greater than a downlink service requirement for using a terminal device. For example, a user usually uses a terminal device to perform live broadcast, or publish audio or a video on the Internet. Some users have a downlink service requirement greater than an uplink service requirement for using a terminal device. For example, a user usually uses a terminal device to play audio or a video, or download audio or a video. The uplink service requirement includes one or more of bandwidth, a rate, a delay, reliability, or a data transmission capacity of uplink transmission. The downlink service requirement includes one or more of bandwidth, a rate, a delay, reliability, or a data transmission capacity of downlink transmission.

A to consumer (2C) and a to business (2B) service scenarios are used as examples. In the 2C service scenario, a downlink bandwidth requirement is high, and is generally more than 10 times an uplink bandwidth requirement. Differently than the 2C service scenario, in the 2B service scenario, an uplink capacity requirement is high. For example, in areas such as a coal mine, a steel plant, a modern factory, and an enterprise campus, the uplink capacity requirement can reach over 1 Gbps. It should be noted that the 2C and 2B service scenarios are used as examples for description in embodiments of this application. This is not limited in embodiments of this application. A communication resource scheduling method in embodiments of this application is applicable to any wireless communication network having different service requirements.

To meet service requirements of different users for using a terminal device in a wireless communication network, and when wireless spectrum resources are limited, a slot format including a flexible F slot is used in embodiments of this application. Based on an uplink service requirement and a downlink service requirement of a terminal device in a cell, the F slot is flexibly scheduled for uplink transmission or downlink transmission. In a process of flexibly scheduling the F slot, uplink and downlink interference can be avoided through coordinated scheduling in embodiments of this application. For a specific implementation, refer to descriptions of the following embodiment.

Figure 2:
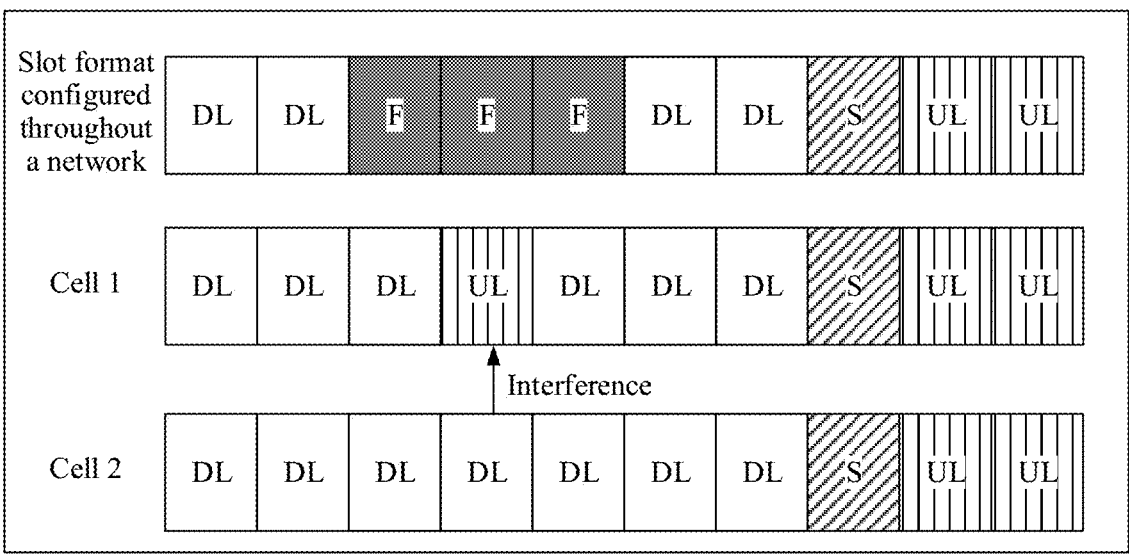
FIG. 2 is a schematic diagram of uplink and downlink interference according to an embodiment of this application.

The uplink and downlink interference refers to interference caused by service transmission in different transmission directions in neighboring cells on a same time-frequency domain resource. A slot format shown in FIG. 2 is used as an example for description. A cell 1 and a cell 2 are neighboring cells. Both the cell 1 and the cell 2 use the slot format shown in a first line of FIG. 2. The slot format includes three F slots. Uplink services of the cell 1 account for a relatively high proportion. Therefore, a radio access network device in the cell 1 schedules one F slot for uplink transmission, and the remaining two F slots are used for downlink transmission. Uplink services of the cell 2 account for a relatively low proportion. Therefore, a radio access network device in the cell 2 schedules the three F timeslots for downlink transmission. It can be learned from FIG. 2 that on a same time-frequency domain resource, that is, a second F slot (that is, a fourth slot), the radio access network device in the cell 1 performs uplink transmission by using the time-frequency domain resource, and the radio access network device in the cell 2 performs downlink transmission by using the time-frequency domain resource. Because transmit power of downlink transmission is far higher than power of uplink transmission, the downlink transmission in the fourth slot of the cell 2 causes interference to the uplink transmission in the fourth slot of the cell 1, causing an uplink transmission bit error.

It should be noted that two neighboring cells are used as examples for description in FIG. 2. A quantity of neighboring cells in embodiments of this application is not limited thereto. There may be 3, 4, 7, or any quantity of neighboring cells. The neighboring cells may be cells of a same radio access network device, or may be cells of different radio access network devices.

Figure 3:
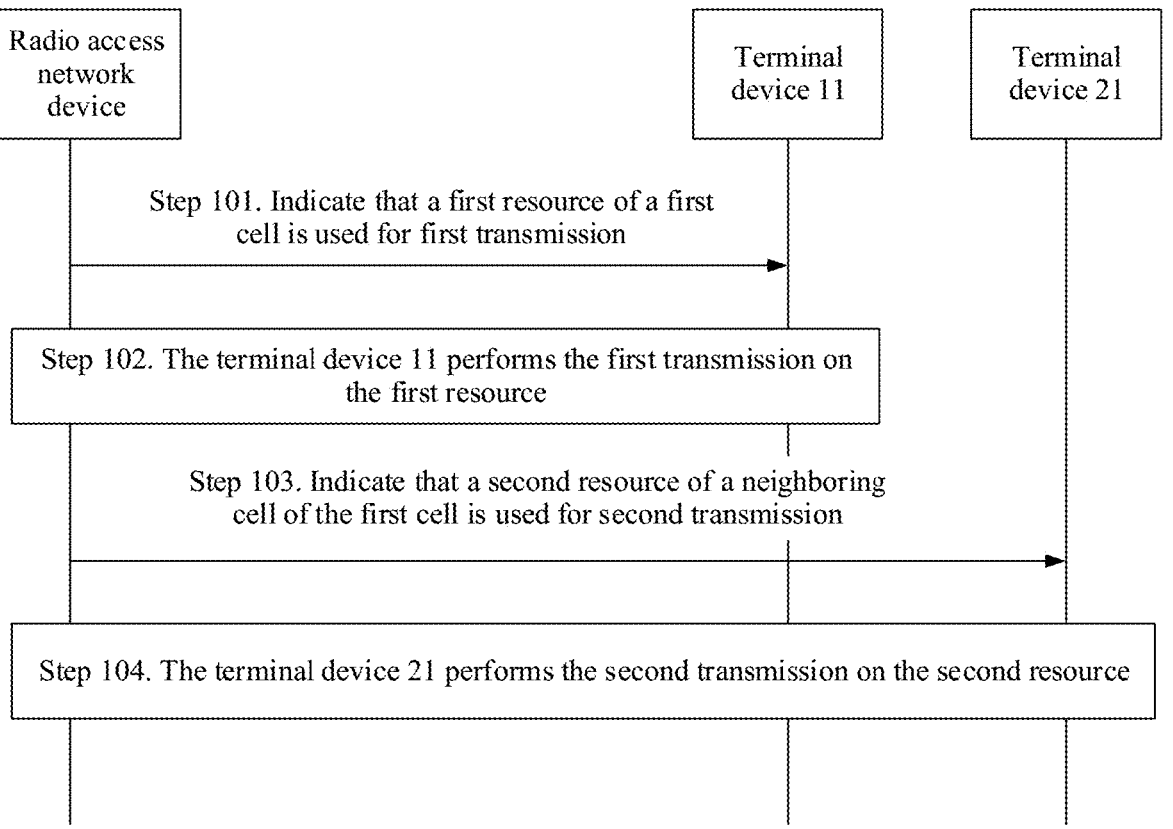
FIG. 3 is a flowchart of a communication resource scheduling method according to an embodiment of this application.

FIG. 3 is a flowchart of a communication resource scheduling method according to an embodiment of this application. This embodiment relates to a radio access network device and a plurality of terminal devices. A coverage area of the radio access network device includes a first cell and a neighboring cell of the first cell. The plurality of terminal devices may include a terminal device 11 in the first cell and a terminal device 21 in the neighboring cell of the first cell. As shown in FIG. 3, the method in this embodiment may include the following steps.

Step 101. The radio access network device indicates, to the terminal device 11, that a first resource of the first cell is used for first transmission.

The first transmission includes uplink transmission or downlink transmission.

The radio access network device may indicate, to the terminal device 11 by using at least one of a system information block (SIB) 1, radio resource control (RRC) signaling, a slot format indicator (SFI), or downlink control information (DCI), that the first resource of the first cell is used for the first transmission.

In some embodiments, the terminal device 11 in the first cell is used as an example for description. It may be understood that the radio access network device may alternatively indicate, to another terminal device in the first cell, for example, a terminal device 12 or a terminal device 13, that the first resource of the first cell is used for the first transmission.

Figures 4A, 4B:
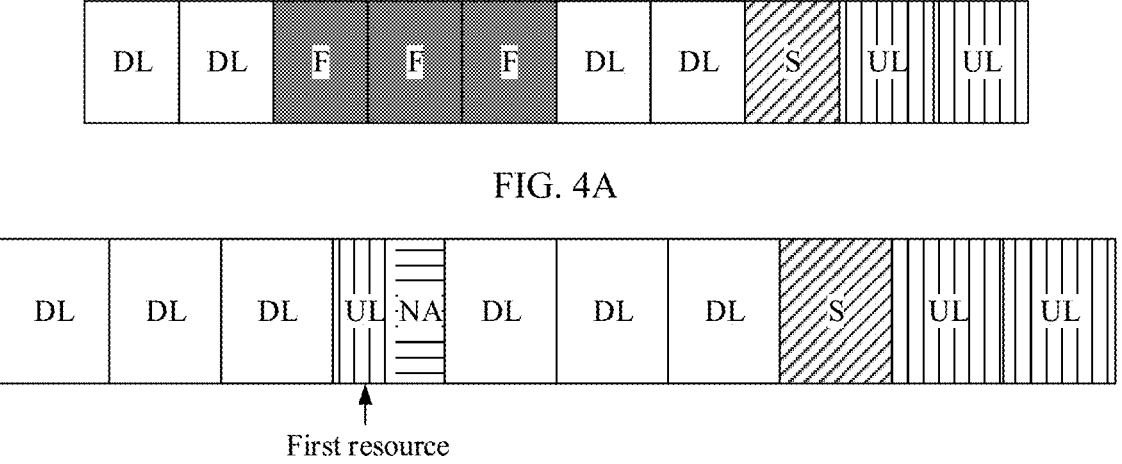
FIG. 4A is a schematic diagram of a slot format according to an embodiment of this application.
FIG. 4B is a schematic diagram of a first resource according to an embodiment of this application.

The first resource may be a part or all of resources in an F slot. For example, the radio access network device uses a slot format shown in FIG. 4A. The slot format includes an F slot, where a quantity of F slots may be set to any integer from 1 to 10. In some embodiments, an example in which the quantity of F slots shown in FIG. 4A is 3 is used for description. The quantity of F slots is not limited to the quantity shown in FIG. 4A. As shown in FIG. 4A, a first slot, a second slot, a sixth slot, and a seventh slot are downlink transmission (DL) slots, an eighth slot is a special(S) slot. Some symbols in the S slot are used for DL, and some symbols in the S slot are used for uplink transmission (UL). The S slot may further include a gap symbol (GAP) for downlink-to-uplink transmission switching. The F slot may be set to support flexible scheduling. For example, the F slot is scheduled for uplink transmission or downlink transmission. In some embodiments, when the quantity of F slots may be set to 10, each slot supports flexible scheduling.

The first resource may be one F slot, a plurality of F slots, a part of frequency-domain resources in one F slot, a part of time-frequency domain resources in one F slot, a part of frequency-domain resources in a plurality of F slots, a part of time-domain resources in one F slot, a part of time-domain resources in a plurality of F slots, or a part of time-frequency domain resources in a plurality of F slots. In other words, the first resource is a part or all of resources in the F slot in the slot format in FIG. 4A.

FIG. 4B is used as an example for description. The first resource may be a resource shown in FIG. 4B, and the first resource is a part of time-domain resources in one F slot. The radio access network device indicates, by using step 101, that the first resource of the first cell is used for the first transmission. In FIG. 4B, the first transmission is UL. The radio access network device may further indicate that a resource other than the first resource that is of the first cell and that is in the three F slots shown in FIG. 4A is used for uplink transmission or downlink transmission. FIG. 4B is used as an example. The radio access network device may indicate that the first F slot and the third F slot that are of the first cell and that are shown in FIG. 4A are used for DL. The radio access network device may not schedule a resource other than the first resource that is of the first cell and that is in the second F slot shown in FIG. 4A.

Optionally, the radio access network device may determine, based on at least one of a service requirement of the terminal device 11, a service requirement of another terminal device in the first cell, or a service requirement of a terminal device in the neighboring cell of the first cell, that the first resource of the first cell is used for the first transmission.

In some embodiments, a service volume of the first transmission of the first cell is greater than a fourth threshold, and/or a service type of the first transmission includes ultra-reliable low-latency communication (URLLC).

The service volume in some embodiments includes at least one of the following: an average actual service volume of the first transmission within first preset duration, an actual service volume of the first transmission at at least one moment, an average predicted service volume of the first transmission within second preset duration, or a predicted service volume of the first transmission at at least one moment. The first preset duration may be any duration such as 5 hours, 6 hours, or 24 hours. The second preset duration may be any duration such as 5 hours, 6 hours, or 24 hours. The first preset duration may be duration in a historical time period, and the second preset duration may be duration in a future time period.

Step 102. The terminal device 11 performs the first transmission on the first resource.

The terminal device 11 performs the first transmission on the first resource based on an indication of the radio access network device. For example, the terminal device performs uplink transmission on the first resource. To be specific, the terminal device sends an uplink signal on the first resource, and correspondingly, the radio access network device receives, on the first resource, the uplink signal sent by the terminal device. For another example, the terminal device performs downlink transmission on the first resource. To be specific, the radio access network device sends a downlink signal on the first resource, and the terminal device receives, on the first resource, the downlink signal sent by the radio access network device.

FIG. 4B is used as an example for further description. The terminal device 11 sends an uplink signal to the radio access network device on the first resource. It may be understood that the terminal device 11 may further perform uplink transmission or downlink transmission on a resource other than the first resource. For example, as shown in FIG. 4B, the terminal device 11 may further perform DL in first, second, third, fifth, sixth and seventh slots, perform DL on some symbols in an eighth slot, perform UL on some symbols in the eighth slot, and perform UL in ninth and tenth slots.

Step 103. The radio access network device indicates, to the terminal device 21, that a second resource of the neighboring cell of the first cell is used for second transmission, where at least one of time domain, frequency domain, space domain, code domain, or power domain of the second resource is different from at least one of time domain, frequency domain, space domain, code domain, or power domain of the first resource.

When the first transmission is uplink transmission, the second transmission is downlink transmission; or when the first transmission is downlink transmission, the second transmission is uplink transmission. That is, transmission directions of the first transmission and the second transmission are opposite.

The radio access network device may indicate, to the terminal device 21 by using at least one of a SIB 1, RRC signaling, an SFI, or DCI, that the second resource of the neighboring cell of the first cell is used for the second transmission. The radio access network device in these embodiments indicate that the first resource of the first cell and the second resource of the neighboring cell of the first cell are used to perform transmission in opposite transmission directions, where at least one of time domain, frequency domain, space domain, code domain, or power domain of the second resource is different from at least one of time domain, frequency domain, space domain, code domain, or power domain of the first resource, to avoid uplink and downlink interference. Space domain may include beam domain. For example, different beam domains may be different beam directions and/or different beam strength. Different power domains may mean different transmit power.

In some embodiments, the terminal device 21 in the neighboring cell of the first cell is used as an example for description. It may be understood that the radio access network device may alternatively indicate, to another terminal device in the neighboring cell, for example, a terminal device 22 or a terminal device 23, that the second resource of the neighboring cell is used for the second transmission.

The second resource may be a part or all of resources in an F slot. The second resource may be one F slot, a plurality of F slots, a part of frequency-domain resources in one F slot, a part of time-frequency domain resources in one F slot, a part of frequency-domain resources in a plurality of F slots, a part of time-domain resources in one F slot, a part of time-domain resources in a plurality of F slots, or a part of time-frequency domain resources in a plurality of F slots.

Figure 4C:
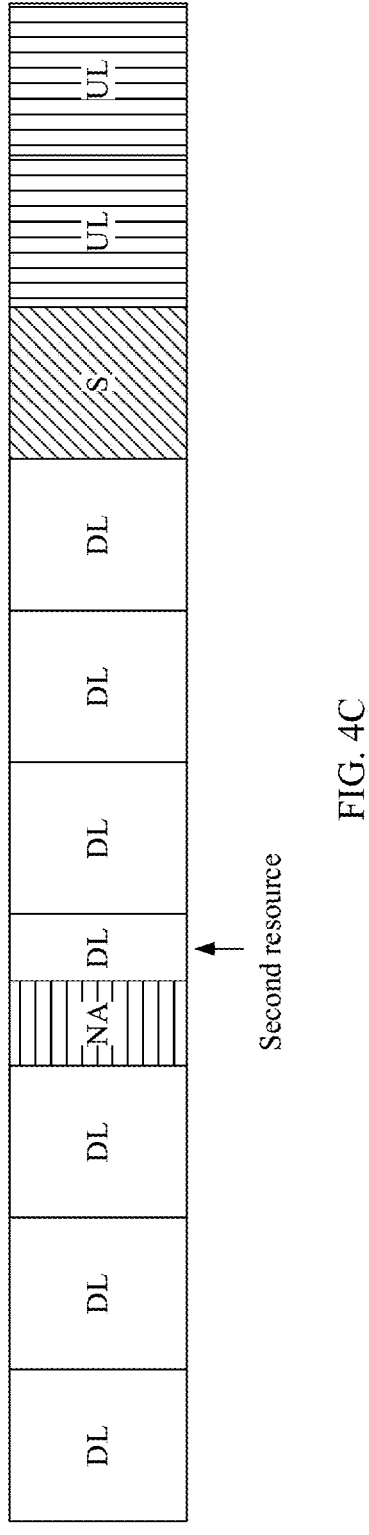
FIG. 4C is a schematic diagram of a second resource according to an embodiment of this application.

FIG. 4C is used as an example for description. The second resource may be a resource shown in FIG. 4C, the second resource is a part of time-domain resources in one F slot, and time domain of the second resource is different from time domain of the first resource. The radio access network device indicates, by using step 103, that the second resource of the neighboring cell of the first cell is used for the second transmission. In FIG. 4C, the second transmission is DL. The radio access network device may further indicate that a resource other than the second resource that is of the neighboring cell of the first cell and that is in the three F slots shown in FIG. 4A is used for uplink transmission or downlink transmission. FIG. 4C is used as an example. The radio access network device may indicate that the first F slot and the third F slot that are of the neighboring cell of the first cell and that are shown in FIG. 4A are used for DL. The radio access network device may not schedule a resource other than the second resource that is of the neighboring cell of the first cell and that is in the second F slot shown in FIG. 4A, for example, not schedule a resource that is of the neighboring cell of the first cell and whose time domain is the same as time domain of the first resource, to avoid uplink and downlink interference.

For example, the first cell is a cell 1, and the neighboring cell of the first cell is a cell 2. A terminal device in the cell 1 has an uplink service requirement. The radio access network device schedules the three F slots that are of the cell 1 and that are shown in FIG. 4A for transmission shown in FIG. 4B. To be specific, the first F slot and the third F slot are used for downlink transmission, and a part of time-domain resources (that is, the first resource) in the second F slot are used for uplink transmission. However, a terminal device in the cell 2 does not have a large quantity of uplink service requirements. The radio access network device schedules the three F slots that are of the cell 2 and that are shown in FIG. 4A for transmission shown in FIG. 4C. To be specific, the first F slot and the third F slot are used for downlink transmission, and a part of time-domain resources (that is, the second resource) in the second F slot are used for downlink transmission. Time domain of the first resource is different from time domain of the second resource, to avoid uplink and downlink interference of neighboring cells while meeting service requirements of terminal devices in different cells.

Optionally, the radio access network device may determine, based on at least one of a service requirement of the terminal device 21, a service requirement of a terminal device in the first cell, or a service requirement of another terminal device in the neighboring cell of the first cell, that the second resource of the neighboring cell of the first cell is used for the second transmission.

Step 104. The terminal device 21 performs the second transmission on the second resource.

The terminal device 21 performs the second transmission on the second resource based on an indication of the radio access network device. For example, the terminal device performs downlink transmission on the second resource. To be specific, the radio access network device sends a downlink signal to the terminal device on the second resource, and the terminal device receives the downlink signal on the second resource. For another example, the terminal device 21 performs uplink transmission on the second resource. To be specific, the terminal device 21 sends an uplink signal on the second resource, and the radio access network device receives the uplink signal sent by the terminal device 21.

FIG. 4C is used as an example for further description. The terminal device 21 receives, on the second resource, the downlink signal sent by the radio access network device. It may be understood that the terminal device 21 may further perform uplink transmission or downlink transmission on a resource other than the second resource. For example, as shown in FIG. 4C, the terminal device 21 may further perform DL in a first, second, third, fifth, sixth and seventh slots, perform DL on some symbols in an eighth slot, perform UL on some symbols in the eighth slot, and perform UL in ninth and tenth slots.

It should be noted that an execution sequence of step 101 and step 103 is not limited by sequence numbers. For example, step 101 and step 103 may be simultaneously performed, or step 103 is performed before step 101. This is not specifically limited in this embodiment of this application.

In some embodiments, it is indicated that the first resource of the first cell is used for the first transmission, and it is indicated that the second resource of the neighboring cell of the first cell is used for the second transmission. At least one of time domain, frequency domain, space domain, code domain, or power domain of the second resource is different from at least one of time domain, frequency domain, space domain, code domain, or power domain of the first resource. Different scheduling manners are used for the first cell and the neighboring cell of the first cell, to meet different service requirements of terminal devices in different cells, and avoid the uplink and downlink interference while meeting the different service requirements.

A scenario is used as an example. An area covered by the first cell is an industrial park, and an uplink transmission requirement of the industrial park is high. However, an area covered by the neighboring cell of the first cell is a residential area, and a downlink transmission requirement of the residential area is high. To meet service transmission requirements of different cells, the method in some embodiments may be used to schedule the first resource in an F slot in the first cell for uplink transmission, and schedule the second resource in an F slot in the neighboring cell of the first cell for downlink transmission. To avoid the uplink and downlink interference, at least one of time domain, frequency domain, space domain, code domain, or power domain of the first resource is different from at least one of time domain, frequency domain, space domain, code domain, or power domain of the second resource.

In some embodiments, it is indicated that the first resource of the first cell is used for the first transmission, to meet a requirement of the first transmission of a terminal device in the first cell, and it is indicated that the second resource of the neighboring cell of the first cell is used for the second transmission, to meet a requirement of the second transmission of the neighboring cell. To avoid the uplink and downlink interference between the first cell and the neighboring cell, at least one of time domain, frequency domain, space domain, code domain, or power domain of the first resource is different from at least one of time domain, frequency domain, space domain, code domain, or power domain of the second resource. Different coordinated scheduling manners for the first resource and the second resource are explained and described in the following embodiments.

Manner 1: Time-domain coordinated scheduling.

In some implementable manners, the first resource of the first cell is used for the first transmission, the second resource of the neighboring cell of the first cell is used for the second transmission, and time domain of the first resource is different from time domain of the second resource.

For example, refer to a manner for scheduling an F slot in FIG. 4B and FIG. 4C. The manner for scheduling an F slot is time-domain coordination.

In some embodiments, when strength of signal interference between the neighboring cell of the first cell and the first cell is greater than a first threshold, and a service volume of the second transmission of the neighboring cell of the first cell is greater than a second threshold, in other words, when strong interference exists between the neighboring cell of the first cell and the first cell, and the requirement of the second transmission of the neighboring cell of the first cell is relatively high, Manner 1, to be specific, the time-domain coordinated scheduling may be used to avoid interference between the first transmission and the second transmission. The first threshold and the second threshold may be flexibly set based on a requirement.

In some embodiments, when strength of signal interference between the neighboring cell of the first cell and the first cell is greater than a first threshold, in other words, when strong interference exists between the neighboring cell of the first cell and the first cell, Manner 1 may be used.

The strong interference usually means that strength of signal interference is close to or exceeds wanted signal strength, and consequently, an interfered signal cannot be used for normal communication. This type of interference usually requires time-domain coordination. To be specific, communication in only one transmission direction (uplink or downlink) can be performed at a same moment.

In another implementable manner, the first resource of the first cell is used for the first transmission, the radio access network device does not schedule the second resource of the neighboring cell of the first cell for the second transmission, and time domain of the first resource is the same as time domain of the second resource.

In some embodiments, when strength of signal interference between the neighboring cell of the first cell and the first cell is greater than a first threshold, and a service volume of the second transmission of the neighboring cell of the first cell is less than a second threshold, in other words, when strong interference exists between the neighboring cell of the first cell and the first cell, and the requirement of the second transmission of the neighboring cell of the first cell is relatively low; the second resource of the neighboring cell of the first cell is not scheduled for the second transmission, to avoid interference between the first transmission and the second transmission.

For the first resource and the second resource for the time-domain coordinated scheduling, frequency domain, space domain, code domain, and power domain of the first resource may be the same as frequency domain, space domain, code domain, and power domain of the second resource.

Manner 2: Frequency-domain coordinated scheduling. To be specific, the first resource of the first cell is used for the first transmission, the second resource of the neighboring cell of the first cell is used for the second transmission, and frequency domain of the first resource is different from frequency domain of the second resource.

For the first resource and the second resource for the frequency-domain coordinated scheduling, time domain, space domain, code domain, and power domain of the first resource may be the same as time domain, space domain, code domain, and power domain of the second resource.

Figure 5A:
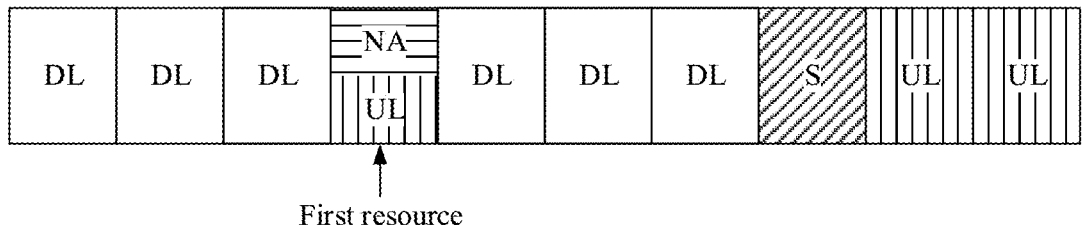
FIG. 5A is a schematic diagram of another first resource according to an embodiment of this application.

FIG. 5A is used as an example for description. The first resource may be a resource shown in FIG. 5A, and the first resource is a part of frequency-domain resources in one F slot. The radio access network device indicates, by using step 101, that the first resource of the first cell is used for the first transmission. In FIG. 5A, the first transmission is UL. The radio access network device may further indicate that a resource other than the first resource that is of the first cell and that is in the three F slots shown in FIG. 4A is used for uplink transmission or downlink transmission. FIG. 5A is used as an example. The radio access network device may indicate that the first F slot and the third F slot that are of the first cell and that are shown in FIG. 4A are used for DL. The radio access network device may not schedule a resource other than the first resource that is of the first cell and that is in the second F slot shown in FIG. 4A.

Figure 5B:
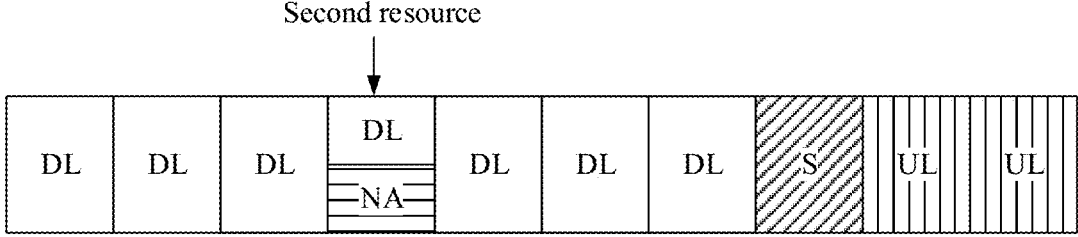
FIG. 5B is a schematic diagram of another second resource according to an embodiment of this application.

FIG. 5B is used as an example for description. The second resource may be a resource shown in FIG. 5B, the second resource is a part of frequency-domain resources corresponding to one F slot, and frequency domain of the second resource is different from frequency domain of the first resource. Optionally, time domain of the second resource is the same as time domain of the first resource. The radio access network device indicates, by using step 103, that the second resource of the neighboring cell of the first cell is used for the second transmission. In FIG. 5B, the second transmission is DL. The radio access network device may further indicate that a resource other than the second resource that is of the neighboring cell of the first cell and that is in the three F slots shown in FIG. 4A is used for uplink transmission or downlink transmission. FIG. 5B is used as an example. The radio access network device may indicate that the first F slot and the third F slot that are of the neighboring cell of the first cell and that are shown in FIG. 4A are used for DL. The radio access network device may not schedule a resource other than the second resource that is of the neighboring cell of the first cell and that is in the second F slot shown in FIG. 4A, for example, not schedule a resource that is of the neighboring cell of the first cell and whose frequency domain is the same as frequency domain of the first resource, to avoid uplink and downlink interference.

The first resource in FIG. 5A and the second resource in FIG. 5B are resources for frequency-domain coordinated scheduling between the first cell and the neighboring cell of the first cell.

In some embodiments, when strength of signal interference between the neighboring cell of the first cell and the first cell is less than a first threshold and greater than a third threshold, and a service volume of the second transmission of the neighboring cell of the first cell is greater than a second threshold, in other words, when general interference exists between the neighboring cell of the first cell and the first cell, and the requirement of the second transmission of the neighboring cell of the first cell is relatively high, Manner 2, to be specific, the frequency-domain coordinated scheduling may be used to avoid interference between the first transmission and the second transmission. The first threshold, the second threshold, and the third threshold may be flexibly set based on a requirement.

In some embodiments, when strength of signal interference between the neighboring cell of the first cell and the first cell is less than a first threshold and greater than a third threshold, in other words, when general interference exists between the neighboring cell of the first cell and the first cell, Manner 2 may be used.

The general interference means that strength of signal interference is weaker than a range of wanted signal strength, and consequently, communication performance of an interfered signal is degraded. A frequency-domain coordinated manner may be used for this type of interference. To be specific, a part of frequency-domain resources are scheduled for the first cell, and the other part of frequency-domain resources are invoked for the neighboring cell of the first cell.

Manner 3: Space-domain, code-domain, or power-domain coordinated scheduling. To be specific, the first resource of the first cell is used for the first transmission, the second resource of the neighboring cell of the first cell is used for the second transmission, and space domain, code domain, or power domain of the first resource is different from space domain, code domain, or power domain of the second resource.

For the first resource and the second resource for the space-domain, code-domain, or power-domain coordinated scheduling, time domain and frequency domain of the first resource may be the same as time domain and frequency domain of the second resource.

Figure 5C:
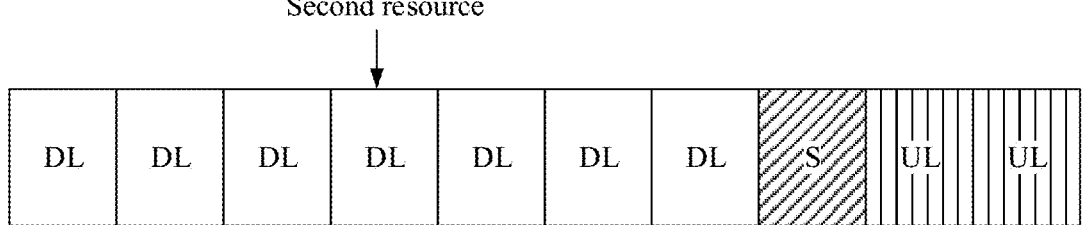
FIG. 5C is a schematic diagram of another second resource according to an embodiment of this application.

The first resource shown in FIG. 5A is used as an example for further description. For the space-domain, code-domain, or power-domain coordinated scheduling, the second resource may be shown in FIG. 5C. The second resource is one F slot in the slot format shown in FIG. 4A. The radio access network device schedules the F slot for the second transmission. Space domain, code domain, or power domain of the second resource is different from space domain, code domain, or power domain of the first resource. The radio access network device indicates, by using step 103, that the second resource of the neighboring cell of the first cell is used for the second transmission. In FIG. 5C, the second transmission is DL. The radio access network device may further indicate that a resource other than the second resource that is of the neighboring cell of the first cell and that is in the three F slots shown in FIG. 4A is used for uplink transmission or downlink transmission. FIG. 5C is used as an example. The radio access network device may indicate that the first F slot and the third F slot that are of the neighboring cell of the first cell and that are shown in FIG. 4A are used for DL. Although time domain and frequency domain of the first resource are the same as time domain and frequency domain of the second resource, because space domain, code domain, or power domain of the first resource is different from space domain, code domain, or power domain of the second resource, uplink and downlink interference can also be avoided.

In some embodiments, when strength of signal interference between the neighboring cell of the first cell and the first cell is less than a third threshold, and a service volume of the second transmission of the neighboring cell of the first cell is greater than a second threshold, in other words, when weak interference exists between the neighboring cell of the first cell and the first cell, and the requirement of the second transmission of the neighboring cell of the first cell is relatively high. Manner 3, to be specific, the space-domain, code-domain, or power-domain coordinated scheduling may be used to avoid interference between the first transmission and the second transmission. The first threshold, the second threshold, and the third threshold may be flexibly set based on a requirement.

In some embodiments, when strength of signal interference between the neighboring cell of the first cell and the first cell is less than a third threshold, in other words, when weak interference exists between the neighboring cell of the first cell and the first cell, Manner 3 may be used.

The weak interference means that strength of interference between signals is weak, and impact on communication performance is limited. Space/power-domain coordination may be used for this type of interference. Space domain refers to changing signal directivity to further reduce interference. Power domain refers to reducing signal strength to further reduce interference. In addition, beam domain (which means that different cells use signals in different beam directions to reduce interference) and/or a code domain (which means that different cells use orthogonal code to reduce interference) may be combined to reduce interference in a coordinated manner.

The coordinated scheduling manner is described above by using Manner 1, Manner 2, and Manner 3 as examples. Alternatively, the coordinated scheduling manner may be a combination of different coordinated scheduling manners. For example, frequency domain and space domain of the first resource are different from frequency domain and space domain of the second resource. Examples are not described one by one in some embodiments.

Figure 6A:
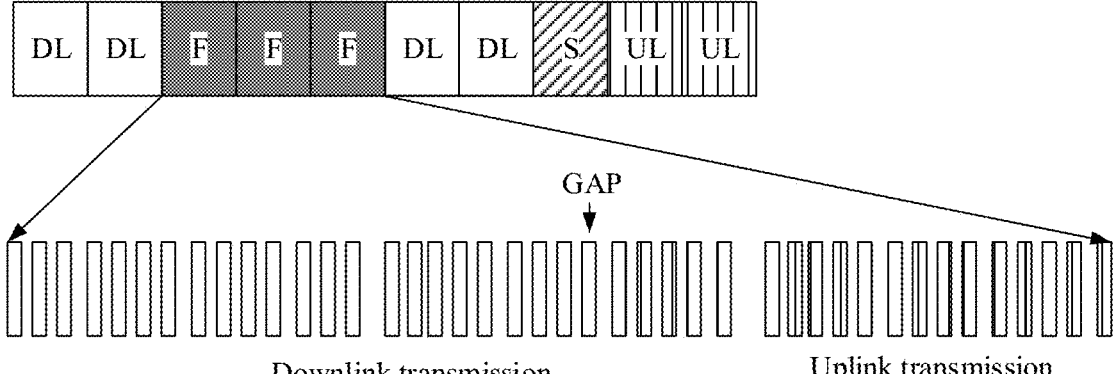
FIG. 6A is a schematic diagram of a granularity of time-domain coordinated scheduling according to an embodiment of this application.
Figure 6B:
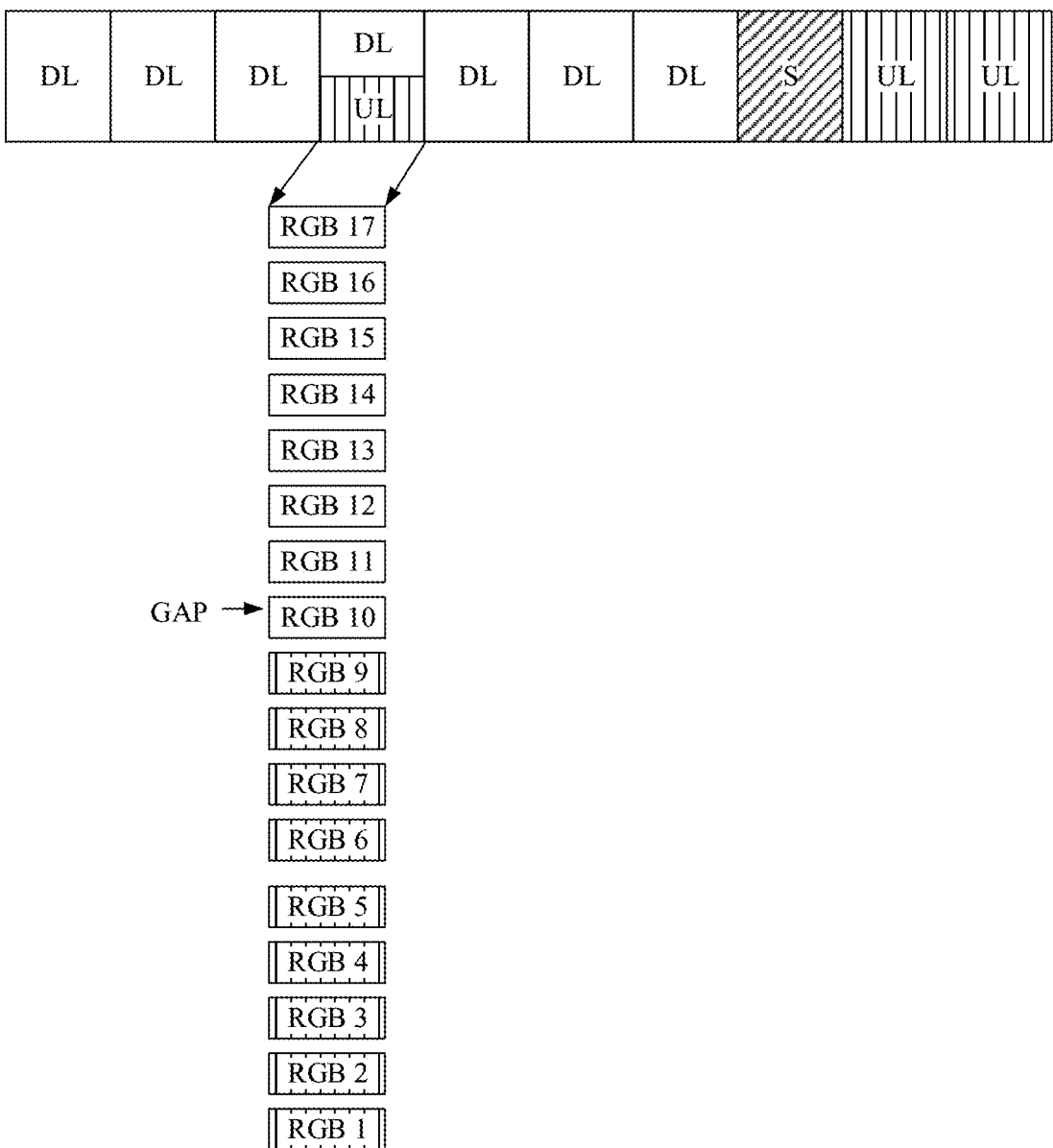
FIG. 6B is a schematic diagram of a granularity of frequency-domain coordinated scheduling according to an embodiment of this application.

The time-domain coordinated scheduling and frequency-domain coordinated scheduling are explained and described. For the time-domain coordinated scheduling, a granularity of the time-domain coordinated scheduling may be a slot or a symbol. FIG. 6A is used as an example. FIG. 6A is a schematic diagram of a granularity of time-domain coordinated scheduling according to an embodiment of this application. As shown in FIG. 6A, some symbols in an F slot and a complete F slot may be scheduled for downlink transmission, remaining time-domain resources in three F slots are used for uplink transmission, and there is a GAP for switching downlink transmission to uplink transmission. For the frequency-domain coordinated scheduling, a granularity of the frequency-domain coordinated scheduling may be a physical resource block group (RGB) or the like. FIG. 6B is used as an example. FIG. 6B is a schematic diagram of a granularity of frequency-domain coordinated scheduling according to an embodiment of this application. As shown in FIG. 6B, a part of frequency-domain resources in an F slot may be scheduled for the first transmission. For example, an RGB 1 to an RGB 9 in the F slot are scheduled for the first transmission of the first cell, and remaining RGB 11 to RGB 17 are scheduled for the second transmission of the neighboring cell of the first cell.

Figure 7:
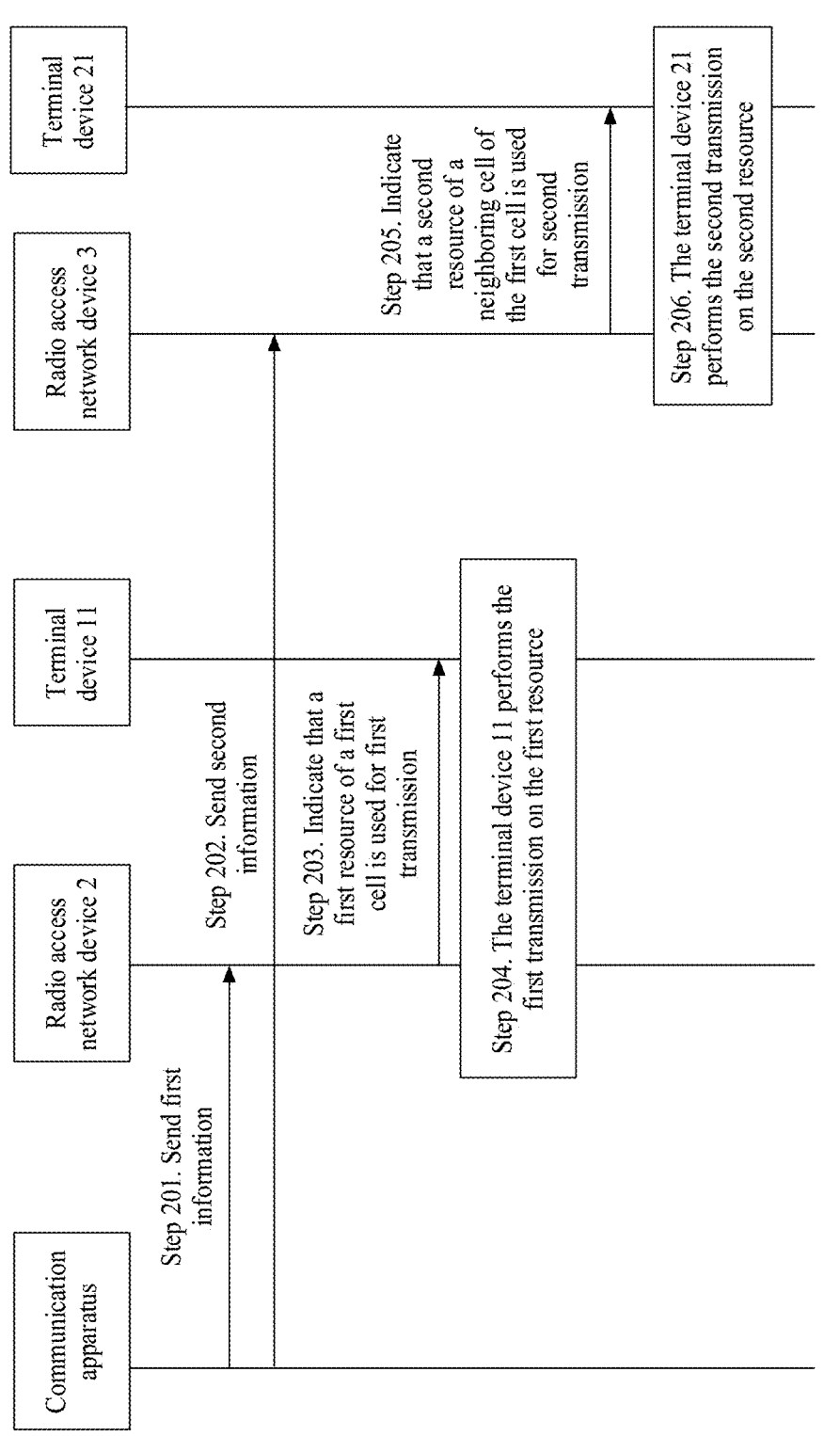
FIG. 7 is a flowchart of another communication resource scheduling method according to an embodiment of this application.

FIG. 7 is a flowchart of another communication resource scheduling method according to an embodiment of this application. Different from the embodiment shown in FIG. 3, some embodiments relate to a plurality of radio access network devices, for example, a communication apparatus, a radio access network device 2, and a radio access network device 3. A coverage area of the radio access network device 2 includes a first cell, and a coverage area of the radio access network device 3 includes a neighboring cell of the first cell. A plurality of terminal devices may include a terminal device 11 in the first cell and a terminal device 21 in the neighboring cell of the first cell. The communication apparatus may be a radio access network device or an internal chip of the radio access network device, or may be a network management device or the like. As shown in FIG. 7, the method in some embodiments may include the following steps.

Step 201. The communication apparatus sends first information to the radio access network device 2.

The radio access network device 2 receives the first information sent by the communication apparatus, where the first information indicates that a first resource of the first cell is used for first transmission.

Step 202. The communication apparatus sends second information to the radio access network device 3.

The radio access network device 3 receives the second information sent by the communication apparatus, where the second information indicates that a second resource of the neighboring cell of the first cell is used for second transmission. At least one of time domain, frequency domain, space domain, code domain, or power domain of the second resource is different from at least one of time domain, frequency domain, space domain, code domain, or power domain of the first resource.

In some embodiments, the communication apparatus determines a coordinated scheduling manner for the first cell and the neighboring cell of the first cell, and indicates corresponding radio access network devices, for example, the radio access network device 2 and the radio access network device 3 in this embodiment. A coordinated scheduling manner of the first resource and the second resource may be any one of the foregoing Manner 1, Manner 2, or Manner 3, or a combination thereof.

Step 203. The radio access network device 2 indicates, to the terminal device 11, that the first resource of the first cell is used for the first transmission.

The radio access network device 2 indicates, to the terminal device 11 based on the first information, that the first resource of the first cell is used for first transmission.

Step 204. The terminal device 11 performs the first transmission on the first resource.

Step 205. The radio access network device 3 indicates, to the terminal device 21, that the second resource of the neighboring cell of the first cell is used for the second transmission.

The radio access network device 3 indicates, to the terminal device 21 based on the second information, that the second resource of the neighboring cell of the first cell is used for the second transmission.

Step 206. The terminal device 21 performs the second transmission on the second resource.

For specific explanations and descriptions of step 203 to step 206, refer to explanations and descriptions of step 101 to step 104 in the embodiments shown in FIG. 3. Details are not described herein again.

It should be noted that an execution sequence of step 201 to step 206 is not limited by sequence numbers. Step 201 to step 206 may be simultaneously performed, or step 202 is performed before step 201. Examples are not described one by one in some embodiments.

In some embodiments, it is indicated that the first resource of the first cell is used for the first transmission, and it is indicated that the second resource of the neighboring cell of the first cell is used for the second transmission. At least one of time domain, frequency domain, space domain, code domain, or power domain of the second resource is different from at least one of time domain, frequency domain, space domain, code domain, or power domain of the first resource. Different scheduling manners are used for the first cell and the neighboring cell of the first cell, to meet different service requirements of terminal devices in different cells, and avoid the uplink and downlink interference while meeting the different service requirements.

Figure 8:
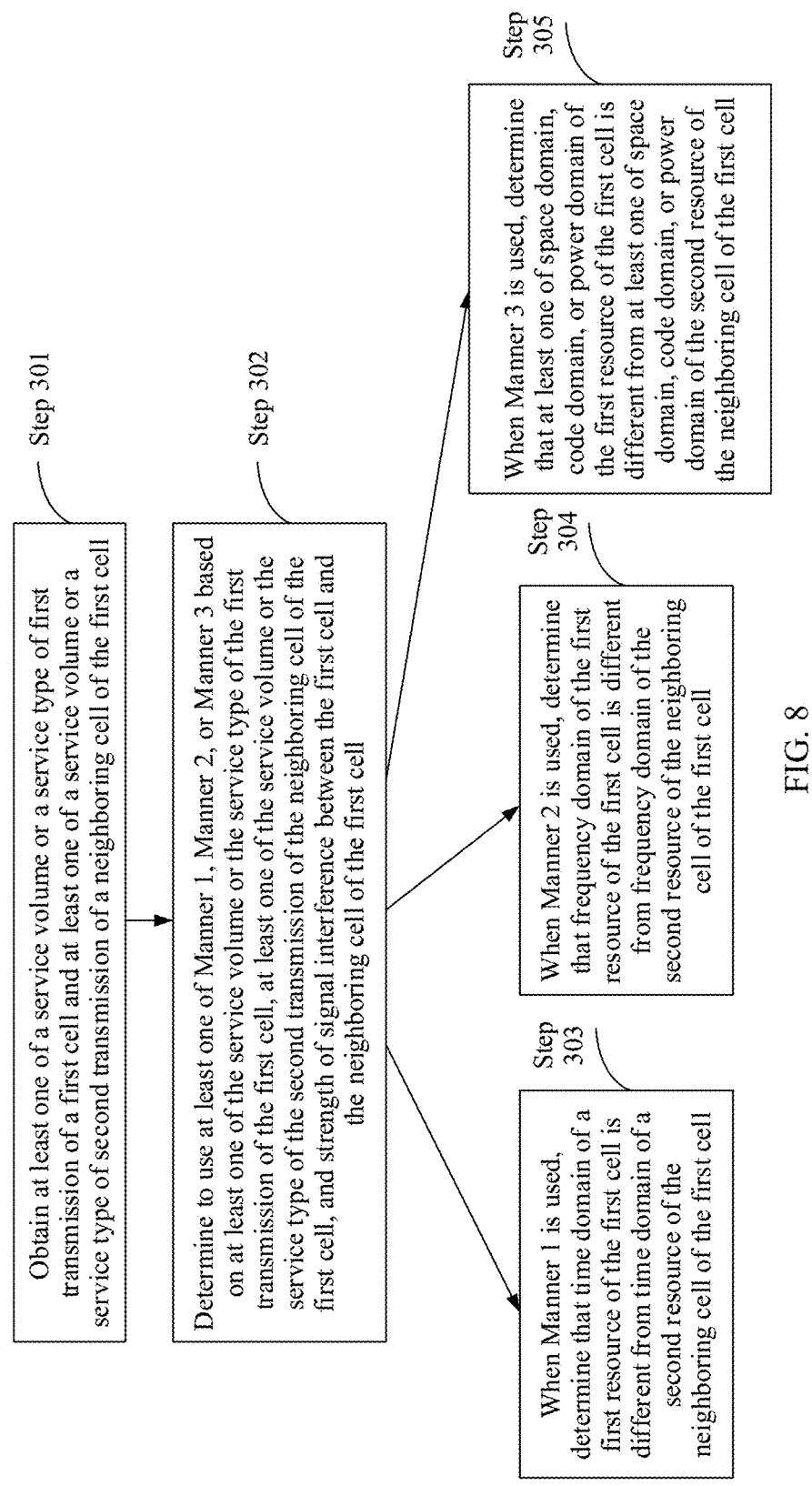
FIG. 8 is a flowchart of a method for determining a coordinated scheduling manner according to an embodiment of this application.

FIG. 8 is a flowchart of a method for determining a coordinated scheduling manner according to an embodiment of this application. Based on the embodiments shown in FIG. 3 or FIG. 7, this embodiment explains and describes determining of the coordinated scheduling manner. This embodiment may be executed by the radio access network device in the embodiment shown in FIG. 3, or a chip or a board in the radio access network device, or may be executed by the communication apparatus in the embodiment shown in FIG. 7. As shown in FIG. 8, the method in this embodiment may include the following steps.

Step 301. Obtain at least one of a service volume or a service type of first transmission of a first cell and at least one of a service volume or a service type of second transmission of a neighboring cell of the first cell.

For example, the radio access network device may receive at least one of service volume indication information or service type indication information sent by a terminal device in the first cell, and the radio access network device determines at least one of the service volume or the service type of the first transmission based on at least one of the service volume indication information or the service type indication information. The service type indication information may be any value from 1 to 10. Any value from 1 to 10 indicates a service volume. The service type indication information may be a Quality of Service (QoS) class identifier (QCI). Similarly, the radio access network device may receive at least one of service volume indication information or service type indication information sent by a terminal device in the neighboring cell of the first cell, and determine at least one of the service volume or the service type of the second transmission based on at least one of the service volume indication information or the service type indication information.

The service volume of the second transmission in some embodiments includes at least one of the following: an average actual service volume of the second transmission within first preset duration, an actual service volume of the second transmission at at least one moment, an average predicted service volume of the second transmission within second preset duration, or a predicted service volume of the second transmission at at least one moment. The first preset duration may be any duration such as 5 hours, 6 hours, or 24 hours. The second preset duration may be any duration such as 5 hours, 6 hours, or 24 hours. The first preset duration may be duration in a historical time period, and the second preset duration may be duration in a future time period.

Step 302. Determine to use at least one of Manner 1, Manner 2, or Manner 3 based on at least one of the service volume or the service type of the first transmission of the first cell, at least one of the service volume or the service type of the second transmission of the neighboring cell of the first cell, and strength of signal interference between the first cell and the neighboring cell of the first cell.

For example, when the service volume of the first transmission is greater than a fourth threshold, and/or the service type of the first transmission includes URLLC, it is determined that first transmission enhancement, for example, uplink transmission enhancement, needs to be performed in the first cell. When the first transmission enhancement needs to be performed in the first cell, it may be determined, based on at least one of the service volume or the service type of the second transmission of the neighboring cell of the first cell, and the strength of the signal interference between the first cell and the neighboring cell of the first cell, to use at least one of Manner 1, Manner 2, or Manner 3. For example, when the service volume of the second transmission of the neighboring cell of the first cell is greater than a second threshold, it is determined, based on the strength of the signal interference between the first cell and the neighboring cell of the first cell, to use Manner 1, Manner 2, or Manner 3.

In some embodiments, when the service volume of the second transmission of the neighboring cell of the first cell is small, a time-domain coordinated manner may be used.

In some embodiments, when there is a URLLC service in the first cell, the time-domain coordinated manner may be used.

Step 303. When Manner 1 is used, determine that time domain of the first resource of the first cell is different from time domain of the second resource of the neighboring cell of the first cell.

Frequency domain, and space domain, code domain, or power domain of the first resource are the same as frequency domain, and space domain, code domain, or power domain of the second resource.

For specific explanations and descriptions of Manner 1, refer to the explanations and descriptions in the foregoing embodiment. Details are not described herein again.

Step 304. When Manner 2 is used, determine that frequency domain of the first resource of the first cell is different from frequency domain of the second resource of the neighboring cell of the first cell.

Time domain, and space domain, code domain, or power domain of the first resource are the same as time domain, and space domain, code domain, or power domain of the second resource.

For specific explanations and descriptions of Manner 2, refer to the explanations and descriptions in the foregoing embodiment. Details are not described herein again.

Step 305. When Manner 3 is used, determine that at least one of space domain, code domain, or power domain of the first resource of the first cell is different from at least one of space domain, code domain, or power domain of the second resource of the neighboring cell of the first cell.

Time domain and frequency domain of the first resource are the same as time domain and frequency domain of the second resource.

For specific explanations and descriptions of Manner 3, refer to the explanations and descriptions in the foregoing embodiment. Details are not described herein again.

In some embodiments, the first transmission is uplink transmission, and the second transmission is downlink transmission. When there is a cell that has a large downlink transmission service volume and strong interference and that is a neighboring cell of the first cell, the uplink transmission enhancement may not be performed in the first cell.

In some embodiments, the first transmission is uplink transmission, and the second transmission is downlink transmission. When there is a cell in which URLLC service scheduling is performed and that is a neighboring cell of the first cell, the uplink transmission enhancement may not be performed in the first cell.

In this embodiment, it is determined, based on at least one of the service volume or the service type of the first transmission of the first cell, at least one of the service volume or the service type of the second transmission of the neighboring cell of the first cell, and the strength of the signal interference between the first cell and the neighboring cell of the first cell, to use at least one of Manner 1, Manner 2, or Manner 3. A proper coordinated scheduling manner is flexibly selected for service requirements of different cells, to avoid uplink and downlink interference.

The strength of the signal interference between the first cell and the neighboring cell of the first cell in the foregoing embodiment is explained and described.

Figure 9A:
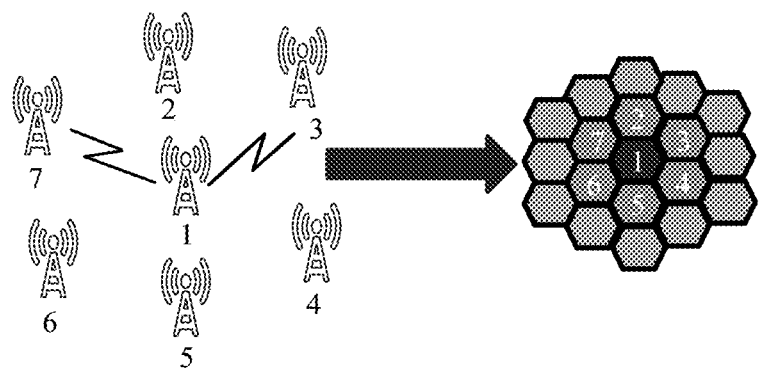
FIG. 9A is a schematic diagram of interference detection according to an embodiment of this application.

FIG. 9A is a schematic diagram of interference detection according to an embodiment of this application. In this embodiment, seven radio access network devices are used, and each radio access network device covers one cell. As shown in FIG. 9A, each hexagonal box represents one cell, and a same frequency band is multiplexed between cells to form a cellular structure, to implement signal coverage in an area. There are several neighboring cells outside each cell, there are several terminal devices in each cell, and a service behavior of each terminal device in each cell is independent. As a result, proportions of uplink and downlink services in different cells are unbalanced. For example, a radio access network device 1 covers a cell 1, a radio access network device 2 covers a cell 2 . . . , and a radio access network device 7 covers a cell 7. The radio access network device 1 sends a sounding signal in a broadcast manner. The radio access network device 2 to the radio access network device 7 separately receive the sounding signal, and measure strength of signal interference between two cells. The radio access network device 2 to the radio access network device 7 may feed back the measured strength of the signal interference to the radio access network device 1. Similarly, the radio access network device 2 sends a sounding signal in a broadcast manner. The radio access network device 1 and the radio access network device 3 to the radio access network device 7 separately receive the sounding signal, and measure strength of signal interference between two cells. The radio access network device 1 and the radio access network device 3 to the radio access network device 7 may feed back the measured strength of the signal interference to the radio access network device 2. Another radio access network device broadcasts a sounding signal in a similar manner, and receives fed-back strength of signal interference. Based on this, strength of signal interference between any two cells may be obtained. Each radio access network device may feed back the strength of the signal interference to the radio access network device that performs the method in the embodiment shown in FIG. 8, to determine to use at least one of Manner 1. Manner 2, or Manner 3.

Figure 9B:
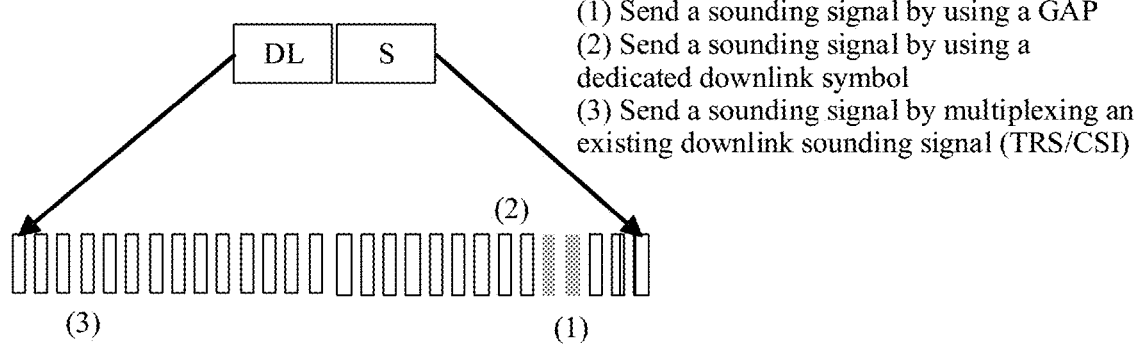
FIG. 9B is a schematic diagram of a manner of sending a sounding signal according to an embodiment of this application.

Each radio access network device may send a sounding signal in any one of the following manners: (1) by using a GAP: (2) by using a dedicated downlink symbol: or (3) by multiplexing an existing downlink sounding signal (TRS/CSI). As shown in FIG. 9B, when DL is switched to UL, there are some GAP symbols, and no normal service is performed on the GAP symbols. In some embodiments, the GAP symbols may be used to send a sounding signal for interference detection. Refer to FIG. 9B. The dedicated downlink symbol may be some symbols in a DL subframe. It is different from the dedicated downlink symbol in that, sending a sounding signal by multiplexing an existing TRS/CSI does not need to occupy an additional downlink symbol.

In some embodiments, the first cell and the neighboring cell of the first cell in any one of the foregoing embodiments may be located in a same cell cluster. Cell cluster division may be performed based on at least one of strength of signal interference between different cells, a maximum quantity of cells in a cell cluster, a geographical location of a radio access network device covering a cell, or a service requirement of a cell. Optionally, the cell cluster division may be performed in an artificial intelligence (AI) learning manner. For example, information such as a service characteristic and an interference characteristic of a cell is learned online by using AI, and the cell cluster division is performed dynamically based on the information. The maximum quantity of cells in a cell cluster may be any value such as 12.

For example, a cell in a cell cluster may meet at least one of the following:

Strength of signal interference of a cell in a cell cluster is greater than a threshold; a physical distance between radio access network devices of cells in a cell cluster is less than a threshold; or service requirements of cells in a cell cluster are service requirements in a same transmission direction, for example, uplink transmission or downlink transmission.

Figure 10:
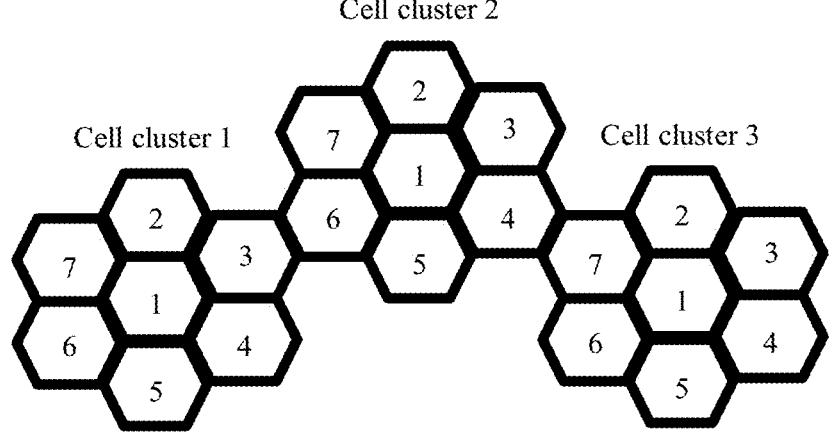
FIG. 10 is a schematic diagram of a result of cell cluster division according to an embodiment of this application.

A result of the cell cluster division may be shown in FIG. 10, that is, a cell cluster 1, a cell cluster 2, and a cell cluster 3. Each cell cluster includes different cells.

In some embodiments, the cell cluster division is performed, and coordinated scheduling is performed in cell clusters, to reduce coordination complexity and a delay, and improve efficiency of the coordinated scheduling.

Figure 11:
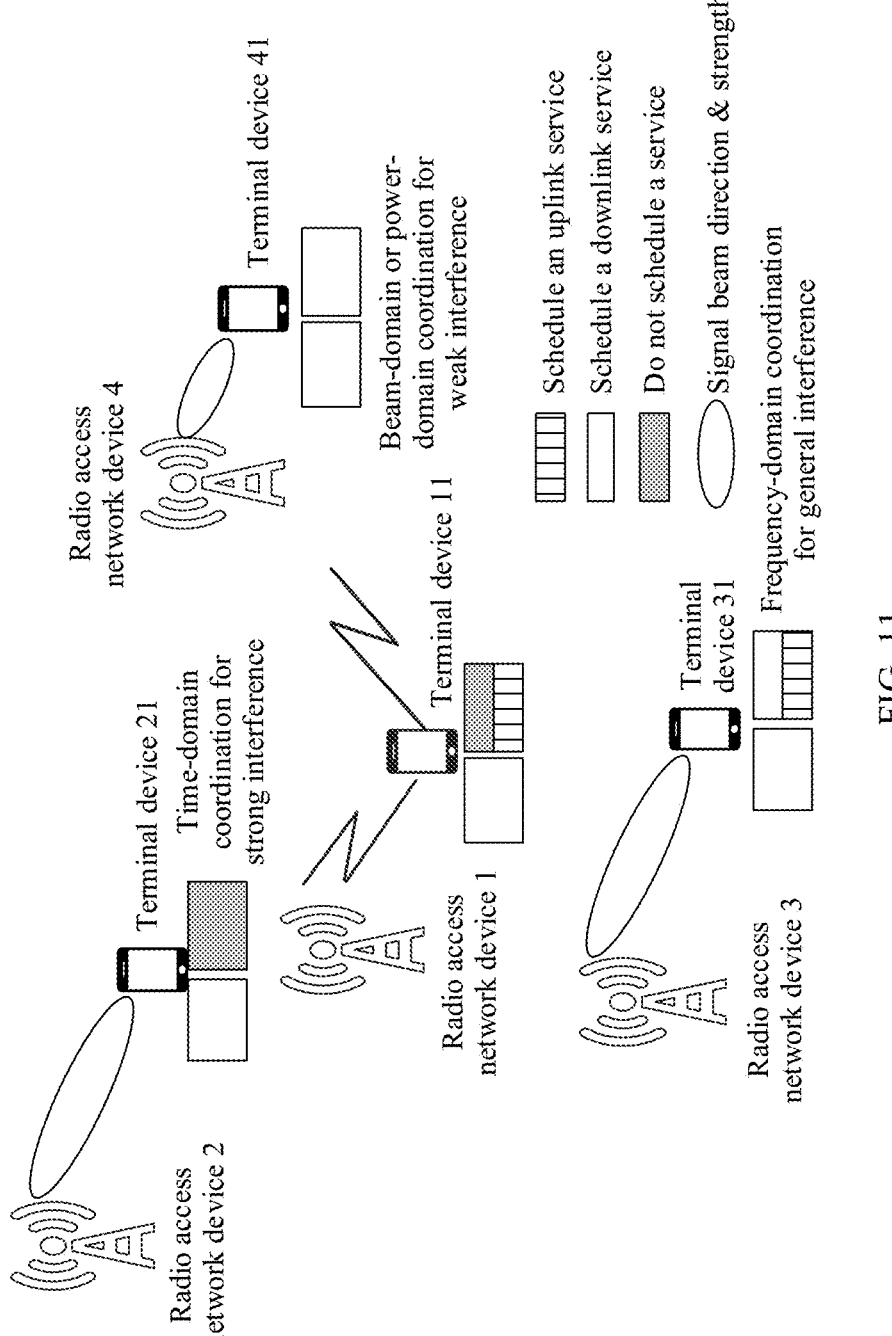
FIG. 11 is a schematic diagram of a communication resource scheduling method according to an embodiment of this application.

The following uses a specific embodiment as an example to describe a communication resource scheduling method in embodiments of this application. FIG. 11 is a schematic diagram of coordinated scheduling according to an embodiment of this application. A first cell is a cell 1 covered by a radio access network device 1, neighboring cells of the first cell include a cell 2 covered by a radio access network device 2, a cell 3 covered by a radio access network device 3, and a cell 4 covered by a radio access network device 4. A terminal device in the cell 1 includes a terminal device 11, a terminal device in the cell 2 includes a terminal device 21, a terminal device in the cell 3 includes a terminal device 31, and a terminal device in the cell 4 includes a terminal device 41. The first transmission is uplink transmission, and the second transmission is downlink transmission.

As shown in FIG. 11, because uplink resource utilization of the cell 1 exceeds 80%, the radio access network device 1 determines that uplink transmission enhancement needs to be performed in the cell 1, that is, a resource in an F slot needs to be scheduled for uplink transmission. As shown in FIG. 11, a part of frequency-domain resources in an F slot of the cell 1 shown in FIG. 11 are scheduled for uplink transmission. Then, the radio access network device 1 determines a coordinated scheduling manner with reference to at least one of service volumes or service types of downlink transmission of the cell 2, the cell 3, and the cell 4. For example, if downlink transmission of the cell 2 has no enhancement requirement, or strength of signal interference between the cell 2 and the cell 1 belongs to a strong interference level, the F slot of the cell 2 may not be scheduled. If downlink transmission of the cell 3 has an enhancement requirement, and strength of signal interference between the cell 3 and the cell 1 belongs to a general interference level, the other part of frequency-domain resources in the F slot of the cell 3 may be scheduled for downlink transmission. If downlink transmission of the cell 4 has an enhancement requirement, and strength of signal interference between the cell 4 and the cell 1 belongs to a weak interference level, an F slot of the cell 4 may be scheduled for downlink transmission, and space domain, code domain, or power domain of the F slot used for downlink transmission is different from space domain, code domain, or power domain of the resource for the uplink transmission enhancement for the cell 1.

Figure 12:
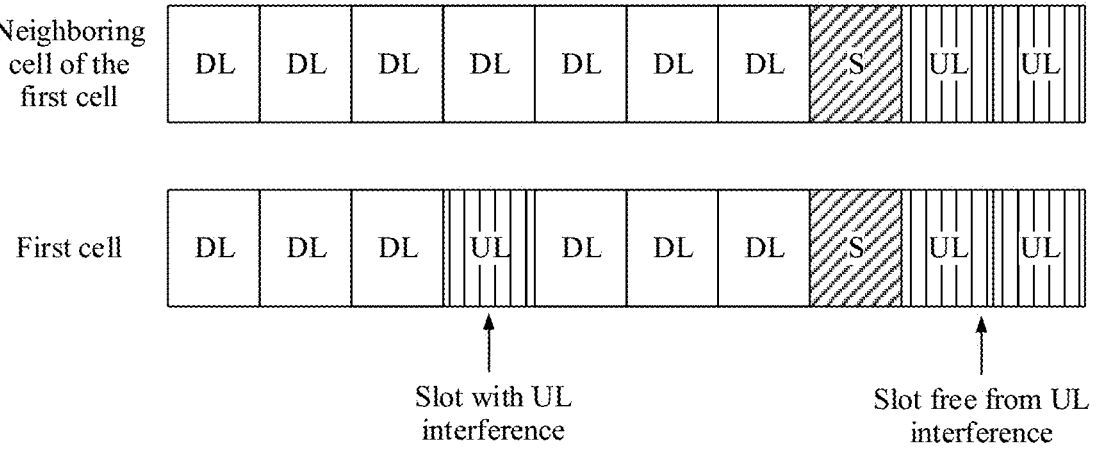
FIG. 12 is a schematic diagram of joint demodulation according to an embodiment of this application.

For demodulation of a resource with uplink transmission interference, for example, refer to a schematic diagram of UL interference shown in FIG. 12. A first resource of a first cell may be a slot with UL interference shown in FIG. 12. A resource that is at a same position as the first resource and that is in a neighboring cell of the first cell is used for downlink transmission, and consequently, interference is caused to the first resource. In some embodiments, a joint demodulation manner may be used. A radio access network device may receive uplink data on the first resource. The uplink data may be demodulated by using a channel estimation result of a demodulation reference signal (DMRS) on a third resource, where the third resource and the first resource have a same frequency-domain position but different time-domain positions. The third resource may be a slot free from UL interference shown in FIG. 12. In other implementable manners, a radio access network device may receive uplink data on the first resource and demodulate the uplink data on the first resource to obtain first demodulated data, receive uplink data on a third resource and demodulate the uplink data on the third resource to obtain second demodulated data, and may combine the first demodulated data and the second demodulated data.

The radio access network device in some embodiments may further schedule a terminal device with low interference in a slot with UL interference, and schedule a terminal device with strong interference in a slot free from UL interference.

In some embodiments, in a coordinated scheduling process, to ensure accuracy of receiving uplink data, the joint demodulation manner may be used to improve demodulation performance and ensure that the data is received accurately.

The foregoing describes the communication resource scheduling method provided in embodiments of this application, and the following describes a communication apparatus provided in embodiments of this application.

Figure 13:
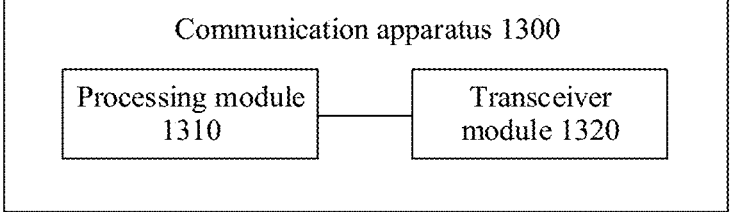
FIG. 13 is a schematic diagram of a communication apparatus 1300 according to an embodiment of this application.

FIG. 13 is a schematic diagram of a communication apparatus 1300 according to an embodiment of this application. The communication apparatus 1300 includes: a processing module 1310, configured to indicate, by using a transceiver module 1320, that a first resource of a first cell is used for first transmission.

The processing module 1310 is further configured to indicate, by using the transceiver module 1320, that a second resource of a neighboring cell of the first cell is used for second transmission, where at least one of time domain, frequency domain, space domain, code domain, and power domain of the second resource is different from at least one of time domain, frequency domain, space domain, code domain, and power domain of the first resource.

When the first transmission is uplink transmission, the second transmission is downlink transmission; or when the first transmission is downlink transmission, the second transmission is uplink transmission.

In some embodiments, both the first resource and the second resource are flexible time-frequency domain resources.

In some embodiments, a service volume of the second transmission of the neighboring cell of the first cell is greater than a second threshold.

In some embodiments, strength of signal interference between the neighboring cell of the first cell and the first cell is greater than a first threshold, and time domain of the second resource of the neighboring cell is different from time domain of the first resource.

In some embodiments, strength of signal interference between the neighboring cell of the first cell and the first cell is less than a first threshold and greater than a third threshold, and frequency domain of the second resource of the neighboring cell is different from frequency domain of the first resource.

In some embodiments, strength of signal interference between the neighboring cell of the first cell and the first cell is less than a third threshold, and at least one of space domain, code domain, or power domain of the second resource of the neighboring cell is different from at least one of space domain, code domain, or power domain of the first resource.

In some embodiments, the first transmission is uplink transmission. The transceiver module 1320 is further configured to receive uplink data on the first resource, and the processing module 1310 is further configured to demodulate the uplink data by using a channel estimation result of a DMRS on a third resource, where the third resource and the first resource have a same frequency-domain position but different time-domain positions; or the transceiver module 1320 is further configured to receive uplink data on the first resource and the processing module is further configured to demodulate the uplink data on the first resource to obtain first demodulated data, the transceiver module 1320 is further configured to receive uplink data on a third resource and the processing module 1310 is further configured to demodulate the uplink data on the third resource to obtain second demodulated data, and combine the first demodulated data and the second demodulated data.

In some embodiments, a service volume of the first transmission is greater than a fourth threshold, and/or a service type of the first transmission includes URLLC.

In some embodiments, the service volume includes at least one of the following: an average actual service volume of the first transmission within first preset duration, an actual service volume of the first transmission at at least one moment, an average predicted service volume of the first transmission within second preset duration, or a predicted service volume of the first transmission at at least one moment.

In some embodiments, the transceiver module 1320 is further configured to receive first information sent by a second communication apparatus, where the first information indicates that the first resource of the first cell is used for the first transmission; or the processing module 1310 is further configured to determine, based on at least one of the service volume or the service type of the first transmission of the first cell and at least one of the service volume or a service type of the second transmission of the neighboring cell of the first cell, whether to use the transceiver module 1320 to perform a step of indicating that the first resource of the first cell is used for the first transmission.

In some embodiments, neighboring cells of the first cell are located in a same cell cluster.

In some embodiments, the processing module 1310 is further configured to send a sounding signal by using the transceiver module 1320, where the sounding signal is used to measure the strength of the signal interference between the first cell and the neighboring cell of the first cell. The transceiver module 1320 is further configured to receive the strength of the signal interference, where the strength of the signal interference is used to determine that at least one of time domain, frequency domain, space domain, code domain, and power domain of the second resource is different from at least one of time domain, frequency domain, space domain, code domain, and power domain of the first resource.

It should be understood that the processing module 1310 in some embodiments may be implemented by a processor or a processor-related circuit component, and the transceiver module 1320 may be implemented by a transceiver or a transceiver-related circuit component.

Figure 14:
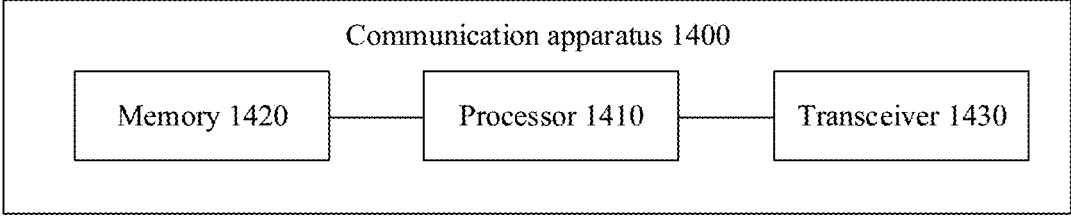
FIG. 14 is a schematic diagram of a communication apparatus 1400 according to an embodiment of this application.

As shown in FIG. 14, an embodiment of this application further provides a communication apparatus 1400. The communication apparatus 1400 includes a processor 1410, a memory 1420, and a transceiver 1430. The memory 1420 stores instructions or a program. The processor 1410 is configured to execute the instructions or the program stored in the memory 1420. When the instructions or the program stored in the memory 1420 is executed, the processor 1410 is configured to perform an operation performed by the processing module 1310 in the foregoing embodiment, and the transceiver 1430 is configured to perform an operation performed by the transceiver module 1320 in the foregoing embodiment.

It should be understood that the communication apparatus 1300 or the communication apparatus 1400 in embodiments of this application may correspond to the radio access network device in any embodiment of FIG. 3 to FIG. 12 in embodiments of this application, and operations and/or functions of modules in the communication apparatus 1300 or the communication apparatus 1400 are separately used to implement corresponding procedures in the methods in any embodiment of FIG. 3 to FIG. 12. For brevity, details are not described herein again.

Figure 15:
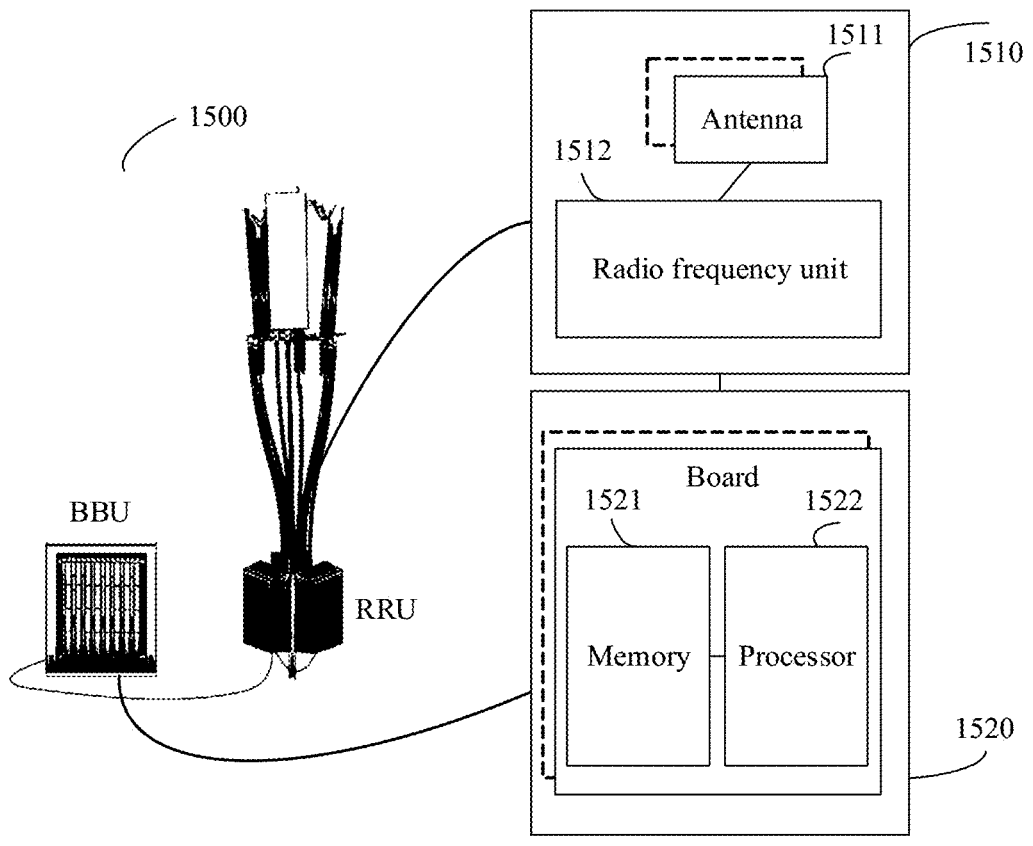
FIG. 15 is a schematic diagram of a communication apparatus 1500 according to an embodiment of this application.

When the apparatus in this embodiment is a radio access network device, the radio access network device may be shown in FIG. 15. An apparatus 1500 includes one or more radio frequency units, such as a remote radio unit (RRU) 1510 and one or more baseband units (BBUs) (which may also be referred to as digital units, DUs) 1520. The RRU 1510 may be referred to as a transceiver module, and corresponds to the transceiver module 1320 in FIG. 13. Optionally, the transceiver module may also be referred to as a transceiver, a transceiver circuit, a transceiving device, or the like, and may include at least one antenna 1511 and a radio frequency unit 1512. The RRU 1510 is configured to: receive and send a radio frequency signal and perform conversion between the radio frequency signal and a baseband signal, for example, configured to indicate, to a terminal device, that a first resource of a first cell is used for first transmission. The BBU 1520 is configured to: perform baseband processing, control a base station, and the like. The RRU 1510 and the BBU 1520 may be physically disposed together, or may be physically disposed separately, namely, a distributed base station.

The BBU 1520 is a control center of the base station, and may also be referred to as a processing module. The BBU 1520 may correspond to the processing module 1310 in FIG. 13, and is configured to implement a baseband processing function such as channel encoding, multiplexing, modulation, or spreading. For example, the BBU (e.g., processing module) may be configured to control the base station to perform an operation procedure related to the radio access network device in the foregoing method embodiments, for example, generate information indicating that a first resource of a first cell is used for first transmission.

In an example, the BBU 1520 may include one or more boards, and a plurality of boards may jointly support a radio access network (for example, an LTE network) of a single access standard, or may separately support radio access networks (for example, an LTE network, a 5G network, or another network) of different access standards. The BBU 1520 further includes a memory 1521 and a processor 1522. The memory 1521 is configured to store instructions and data. The processor 1522 is configured to control the base station to perform an action, for example, configured to control the base station to perform the operation procedure related to the radio access network device in the foregoing method embodiments. The memory 1521 and the processor 1522 may serve one or more boards. In other words, the memory and the processor may be disposed on each board. Alternatively, a plurality of boards may share a same memory and a same processor. In addition, a necessary circuit may further be disposed on each board.

It should be understood that, the processor mentioned in embodiments of the present disclosure may be a central processing unit (CPU), or may be another general-purpose processor, a digital signal processor (DSP), an application-specific integrated circuit (ASIC), a field programmable gate array (FPGA) or another programmable logical device, a discrete gate or a transistor logical device, a discrete hardware component, or the like. The general-purpose processor may be a microprocessor, or the processor may further be any conventional processor, or the like.

It may be understood that the memory mentioned in embodiments of the present disclosure may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory: The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logical device, a discrete gate or a transistor logical device, or a discrete hardware component, the memory (e.g., a storage module) is integrated into the processor.

It should be noted that the memory described in this specification aims to include but is not limited to these memories and any memory of another proper type.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of the present disclosure.

A person of ordinary skill in the art may be aware that, in combination with the examples described in embodiments disclosed in this specification, units (e.g., circuits) and algorithm steps may be implemented by electronic hardware or a combination of computer software and electronic hardware. Whether functions are performed in a hardware or software manner depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual coupling or direct coupling or communication connection may be implemented through some interfaces. The indirect coupling or communication connection between the apparatuses or units may be implemented in an electrical, mechanical, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes: any medium that can store program code, such as a universal serial bus (USB) flash drive, a removable hard disk, a ROM, a RAM, a magnetic disk, or an optical disc.

The foregoing descriptions are merely some implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of present disclosure shall be subject to the protection scope of the claims.

What is claimed is:

1. A communication resource scheduling method, wherein the method comprises:

indicating, by a first communication apparatus, that a first resource of a first cell is used for a first transmission; and indicating, by the first communication apparatus, that a second resource of a neighboring cell of the first cell is used for a second transmission, wherein at least one of a time domain, a frequency domain, a space domain, a code domain, or a power domain of the second resource is different than at least one of a time domain, a frequency domain, a space domain, a code domain, or a power domain of the first resource, a service volume of the second transmission of the neighboring cell of the first cell is greater than a second threshold, and when the first transmission is an uplink transmission, the second transmission is a downlink transmission; or when the first transmission is a downlink transmission, the second transmission is an uplink transmission.

2. The method according to claim 1, wherein both the first resource and the second resource are flexible time-frequency domain resources.

3. The method according to claim 1, wherein a strength of signal interference between the neighboring cell of the first cell and the first cell is greater than a first threshold, and the time domain of the second resource of the neighboring cell is different than the time domain of the first resource.

4. The method according to claim 1, wherein a strength of signal interference between the neighboring cell of the first cell and the first cell is less than a first threshold and greater than a third threshold, and the frequency domain of the second resource of the neighboring cell is different than the frequency domain of the first resource.

5. The method according to claim 1, wherein a strength of signal interference between the neighboring cell of the first cell and the first cell is less than a third threshold, and at least one of the space domain, the code domain, or the power domain of the second resource of the neighboring cell is different than at least one of the space domain, the code domain, or the power domain of the first resource.

6. The method according to claim 1, wherein the first transmission is the uplink transmission, and the method further comprises:

receiving uplink data on the first resource, and demodulating the uplink data by using a channel estimation result of a demodulation reference signal (DMRS) on a third resource, wherein the third resource and the first resource have a same frequency-domain position but different time-domain positions; or receiving the uplink data on the first resource and demodulating the uplink data on the first resource to obtain first demodulated data, receiving the uplink data on the third resource and demodulating the uplink data on the third resource to obtain second demodulated data, and combining the first demodulated data and the second demodulated data.

7. The method according to claim 1, wherein at least one of a service volume of the first transmission is greater than a threshold, or a service type of the first transmission comprises ultra-reliable low-latency communication (URLLC).

8. The method according to claim 7, wherein the service volume of the first transmission comprises at least one of the following: an average actual service volume of the first transmission within a first preset duration, an actual service volume of the first transmission at at least one moment, an average predicted service volume of the first transmission within a second preset duration, or a predicted service volume of the first transmission at at least one moment.

9. The method according to claim 1, wherein the method further comprises:

receiving first information from a second communication apparatus, wherein the first information indicates that the first resource of the first cell is used for the first transmission; or determining, based on at least one of a service volume or a service type of the first transmission of the first cell and at least one of the service volume or a service type of the second transmission of the neighboring cell of the first cell, that the first resource of the first cell is used for the first transmission.

10. The method according to claim 1, wherein neighboring cells of the first cell are located in a same cell cluster.

11. The method according to claim 1, wherein the method further comprises:

sending a sounding signal, wherein the sounding signal is used to measure a strength of the signal interference between the first cell and the neighboring cell of the first cell; and receiving the strength of the signal interference, wherein the strength of the signal interference is used to determine that at least one of the time domain, the frequency domain, the space domain, the code domain, or the power domain of the second resource is different than at least one of the time domain, the frequency domain, the space domain, the code domain, or the power domain of the first resource.

12. A communication apparatus, comprising:

a memory comprising instructions; and one or more processors in communication with the memory, wherein the one or more processors execute the instructions to:

indicate, that a first resource of a first cell is used for a first transmission; and indicate, that a second resource of a neighboring cell of the first cell is used for a second transmission, wherein at least one of a time domain, a frequency domain, a space domain, a code domain, or a power domain of the second resource is different than at least one of a time domain, a frequency domain, a space domain, a code domain, or a power domain of the first resource, a service volume of the second transmission of the neighboring cell of the first cell is greater than a second threshold, and when the first transmission is an uplink transmission, the second transmission is a downlink transmission; or when the first transmission is a downlink transmission, the second transmission is an uplink transmission.

13. The apparatus according to claim 12, wherein both the first resource and the second resource are flexible time-frequency domain resources.

14. The apparatus according to claim 12, wherein a strength of signal interference between the neighboring cell of the first cell and the first cell is greater than a first threshold, and the time domain of the second resource of the neighboring cell is different than the time domain of the first resource.

15. The apparatus according to claim 12, wherein a strength of signal interference between the neighboring cell of the first cell and the first cell is less than a first threshold and greater than a third threshold, and the frequency domain of the second resource of the neighboring cell is different than the frequency domain of the first resource.

16. The apparatus according to claim 12, wherein a strength of signal interference between the neighboring cell of the first cell and the first cell is less than a third threshold, and at least one of the space domain, the code domain, or the power domain of the second resource of the neighboring cell is different than at least one of the space domain, the code domain, or the power domain of the first resource.

17. The apparatus according to claim 12, wherein the first transmission is the uplink transmission, and the one or more processors execute the instructions to:

receive uplink data on the first resource, and demodulate the uplink data by using a channel estimation result of a demodulation reference signal (DMRS) on a third resource, wherein the third resource and the first resource have a same frequency-domain position but different time-domain positions; or receive the uplink data on the first resource and demodulate the uplink data on the first resource to obtain first demodulated data, receive the uplink data on a third resource and demodulate the uplink data on the third resource to obtain second demodulated data, and combine the first demodulated data and the second demodulated data.

18. The apparatus according to claim 12, wherein at least one of a service volume of the first transmission is greater than a threshold, or a service type of the first transmission comprises ultra-reliable low-latency communication (URLLC).

* * * * *